June 2, 1959 E. H. GATZERT 2,889,411

PAGING SYSTEM

Filed May 26, 1958 8 Sheets-Sheet 1

INVENTOR.
ERNEST H. GATZERT

BY Henry H. Gage [signature]

AGENT

June 2, 1959 E. H. GATZERT 2,889,411

PAGING SYSTEM

Filed May 26, 1958 8 Sheets-Sheet 2

June 2, 1959 E. H. GATZERT 2,889,411

PAGING SYSTEM

Filed May 26, 1958 8 Sheets-Sheet 3

ANSWERING CONNECTOR 31

June 2, 1959 E. H. GATZERT 2,889,411

PAGING SYSTEM

Filed May 26, 1958 8 Sheets-Sheet 5

June 2, 1959 E. H. GATZERT 2,889,411

PAGING SYSTEM

Filed May 26, 1958 8 Sheets-Sheet 6

June 2, 1959 E. H. GATZERT 2,889,411

PAGING SYSTEM

Filed May 26, 1958 8 Sheets-Sheet 7

ENCODER CONTROL 61

United States Patent Office 2,889,411

Patented June 2, 1959

2,889,411

PAGING SYSTEM

Ernest H. Gatzert, Rochester, N.Y., assignor to General Dynamics Corporation, a corporation of Delaware Application May 26, 1958, Serial No. 737,638

17 Claims. (Cl. 179—18)

This invention relates to paging systems in general and, more particularly, to paging systems of the so-called "meet me" type.

A "meet me" type paging system for use with dial telephone systems, such as the one disclosed in copending patent application of Gatzert et al., Serial No. 704,487, filed December 23, 1957 and assigned to the same assignee as the present invention, may include a group of calling connectors to which telephone system subscribers desiring to make paging calls have access and a second group of connectors to which telephone system subscribers desiring to answer paging calls have access. Connectors within both groups have access to groups of terminal sets, corresponding terminals of each group being connected by a multiple common to all connectors. With this arrangement, the advance of any calling and any answering connector to corresponding, connected terminal sets is effective for completing a connection between paging and paged parties.

The aforementioned Gatzert et al. application further teaches a system in which the calling connector advanced to any terminal set is effective for causing an encoder control and an encoder transmitter common to both calling and answering connectors to be selectively operated in order to transmit paging signals over another communication medium distinct from the telephone system. The encoder transmitter controls its companion encoder control, which in turn causes the encoder transmitter to send signals over the other communication medium until the paging party disconnects and releases the calling connector or until the paged party causes one of the answering connectors to be advanced into engagement with the terminal set used to complete the paging call. The common encoder transmitter and encoder control may be used to signal indefinitely a particular paged party or parties, making the use of greater-capacity common equipment necessary.

In systems such as the one taught by Gatzert et al., several calling connectors may be taken for use at the same time. Gatzert et al.'s encoder control and encoder transmitter are effective for sequentially serving the needs of all such calling connectors. Because the encoder control and encoder transmitter require a finite time interval to serve each calling connector, the time required to complete transmission of all signals for all demanding calling connectors for a single set of signal transmissions is dependent upon the number of connectors placing calls. Consequently, the time between signals transmitted at the demand of any one calling connector can vary within wide limits.

Therefore, it is an object of my invention to provide a new and improved "meet me" type paging system.

Another object of my invention is to prevent a calling party from continuing indefinitely to signal a particular paging code over a "meet me" type paging system.

Another object of my invention is to provide a paging system of the "meet me" type wherein the transmitted paging signals occur in substantially regular fashion.

I accomplish these and other objects of my invention by providing a communication system of the same general type as disclosed in the aforementioned Gatzert et al. application. The Gatzert et al. system includes first and second subsystems. The first subsystem has a common signal transmitting device such as a wireless transmitter and a plurality of radio frequency receiving stations. Each of the first subsystem stations is assigned a unique directory number comprising one or more digits. This first subsystem may be of the same general type as the one described in copending patent application Serial No. 432,517, filed May 26, 1954, by John R. Scantlin and assigned to the same assignee as the present invention. The signal transmitting device is selectively operable for signaling any one of the receiving stations.

The second subsystem includes a dial type telephone system. The telephone system has an office comprising switching equipment capable of the conventional use of extending connections between calling and called ones of a plurality of lines upon the manipulation of a dial or other signal transmitting device at the telephone station connected to the calling line. A person wishing to page any one of the first subsystem stations, picks up a second subsystem telephone, dials a special access (calling) code in order to extend a connection to special equipment for controlling the first subsystem transmitter and for completing paging connections. Thereafter, the paging party dials the directory number of the required first subsystem station.

The special apparatus includes a first plurality of calling connectors and a second plurality of answering connectors. Each special apparatus connector has access to a plurality of groups of terminal sets, the group of terminal sets accessible to each connector being connected in multiple to corresponding terminal sets in groups accessible to all the other connectors. Certain ones of each multipled terminal set are used for a speech transmission channel. The dial office apparatus is arranged so that when the party wishing to cause the first subsystem to transmit a paging signal dials the calling access number, the office switching equipment is directively operated to select an idle of the calling connectors. Thereafter, when the calling party dials the directory number of the required first subsystem station so that the selected connector is directively operated to extend a connection from the calling line through the switch train including the selected one of the calling connectors to a particular one of the terminal sets, and therefore to a particular speech transmission channel. The calling station and line, and the office switching equipment, therefore, may be considered calling means for directively operating any one of the calling connectors.

The paged or called party, having been notified by the use of the first subsystem, in a manner to be described presently, that the paging party wishes to communicate with him, picks up an idle second subsystem telephone and dials another special access (answering) number and thereafter dials the directory number of his own first subsystem station. Dialing the answering access number causes other office switching equipment to be directively operated to select an idle one of the answering connectors. Thereafter, when the paged party dials further directive digits representing the directory number of the first subsystem, paged station into the selected answering connector a connection is extended over the switch train including the selected one of the answering connectors from the paged party's station to the terminal set multiply connected to the one selected by the aforementioned operated calling connector, and, therefore, to the one of the speech transmission channels previously selected by the calling connector. Thereafter, conversation between the paging and paged parties takes place. Assuming that there are more sets of terminals accessible to each switch than the number of switches in either of the pluralities, it is possible to establish as many conversations between the calling and paged parties as there are pairs of calling and answering connectors.

Within the above-described system, I provide an encoder transmitter common to the calling connectors for signaling the first subsystem station and an encoder control for controlling the encoder transmitter. In addition to its above-described function of establishing a connection between the second subsystem stations, each calling connector includes means effective upon seizure for indicating the extension of a connection thereto, and other means effective in response to directive operation of that connector for energizing start means within the encoder control.

The encoder control start means in operated condition is effective to cause a rotary switch to distribute signals to each of the seized and operated ones of the calling connectors by sequentially establishing connections between the encoder control and each operated one of the calling connectors. Means including relays within the encoder control transmits to each individually connected one of the calling connectors a signal which is effective for operating signal repeating means comprising a relay within that connector. In this fashion, the encoder control is effective for intermittently signaling operated ones of the calling connectors demanding service.

The signal repeating relay in the connector immediately connected to the encoder control is effective for energizing certain ones of the nonspeech transmission channel terminals within the set selected by the operated calling connector. Because these other terminals within each terminal set are unique to one of the plurality of first subsystem stations, the energization of a particular terminal set is effective for selectively operating decoding matrix relays connected by gating diodes to each terminal set in accordance with the identity of the paged first subsystem station. The selective energization of the decoding relays is effective for selectively operating the encoder transmitter. The selectively operated encoder transmitter thereupon signals the one of the first subsystem stations corresponding to the terminal set selected by the operated one of the calling connectors. Upon completion of a single signaling operation, means within the encoder transmitter is effective for dismissing the encoder control with respect to the operated one of the calling connectors. The encoder transmitter then is available to establish in numerical sequence connections to other operated ones of the calling connectors demanding such service. Upon serving each demanding calling connector once, the encoder control returns to the first-demanding calling connector and is available to serve that connector if the demand for service is still present. Assuming that the one of the connectors remains in operated condition for a sufficient length of time for the common encoder control to return thereto, the encoder control can be effective for causing that connector's repeating means to transmit a series of signals to the decoding means and encoder transmitter.

My invention is directed to the relationship among and is next described in terms of the calling and answering connectors and the common encoder control described in the above paragraphs.

In order to prevent an operated one of the calling connectors from continuing to transmit identity signals to the decoding means and encoder transmitter indefinitely, the repeating means is also effective upon each operation for operating a counting device within the operated connector. Upon the registration of a predetermined number of signaling operations in the counting device, the counting device is effective for making ineffective the aforementioned connector means for transmitting start signals to the encoder control. With this arrangement, the encoder control thereafter fails to respond to the operated condition of the calling connector.

Because the decoding means and encoder transmitter require a finite time interval to be operated and because the number of calling connectors placed in operated condition at the same time may vary, it is desired to make the time required for the encoder control to take care of all operated calling connectors and to return to the one being considered here a predetermined minimum in order to insure to a certain degree of uniformity of signal transmission to any one of the first subsystem stations. To this end, I provide means for insuring that no more than a predetermined maximum number of connectors may be coincidentally operated and demanding service of the encoder control. Accordingly, I provide group busy marking means within the encoder control operative only in response to the operation of the seizure responsive means within a predetermined number of calling connectors for making the encoder control ineffective with respect to the idle ones of the connectors by marking all such idle or unseized ones of the calling connectors busy to the second subsystem switching equipment. With this arrangement, after the predetermined number of calling connectors has been taken for use, all calling connectors are marked busy to parties wishing to place a paging call until at least some of the connectors have stopped transmitting demand signals to the encoder control.

In the following description, reference is made to the drawings attached to and forming a part of the present specification, and in which:

Fig. 1 shows a block diagram of the system;

Figs. 2*a* and 2*b* show a schematic diagram of an incoming paging connector;

Figure 6A:
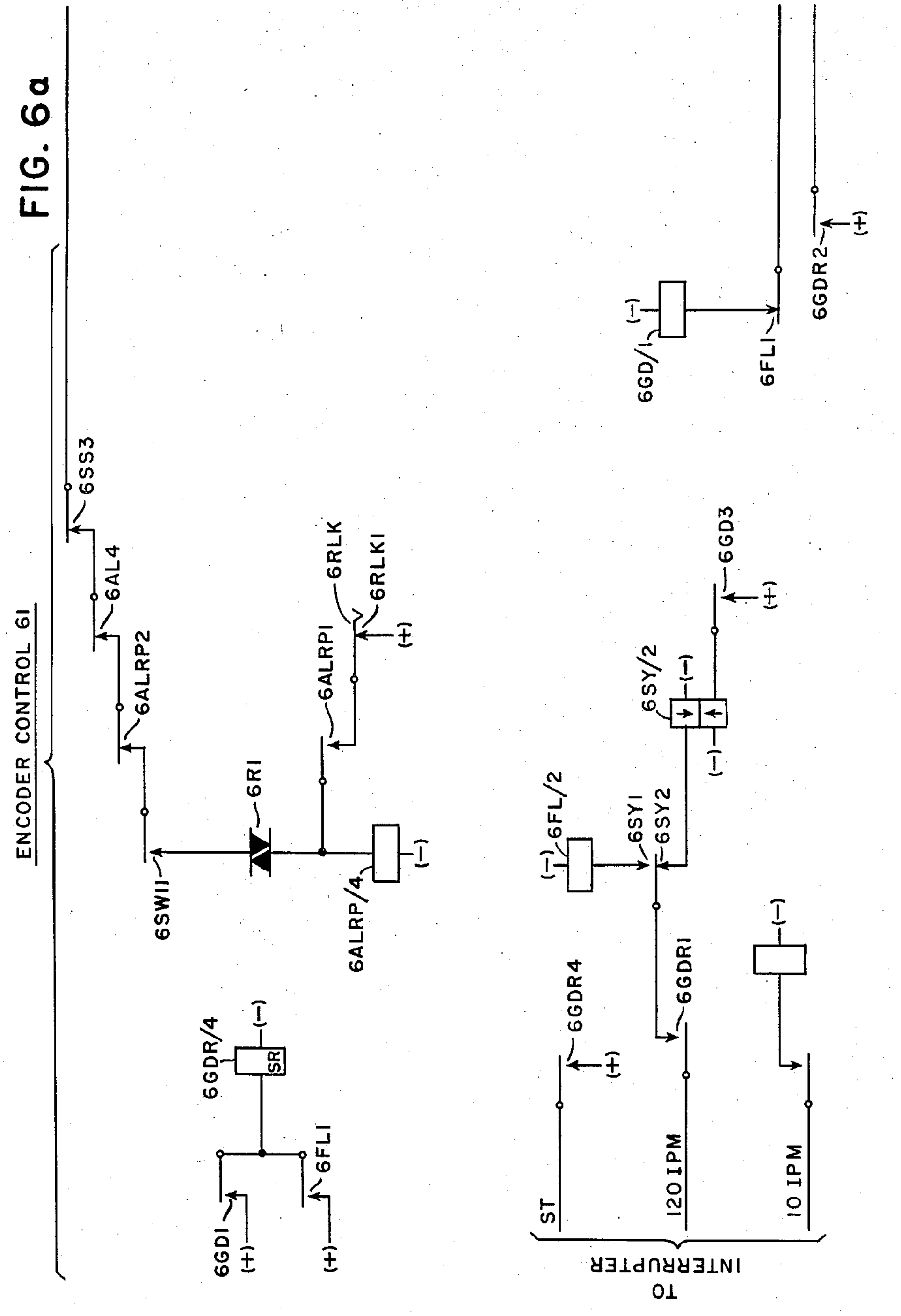
Figure 6B:
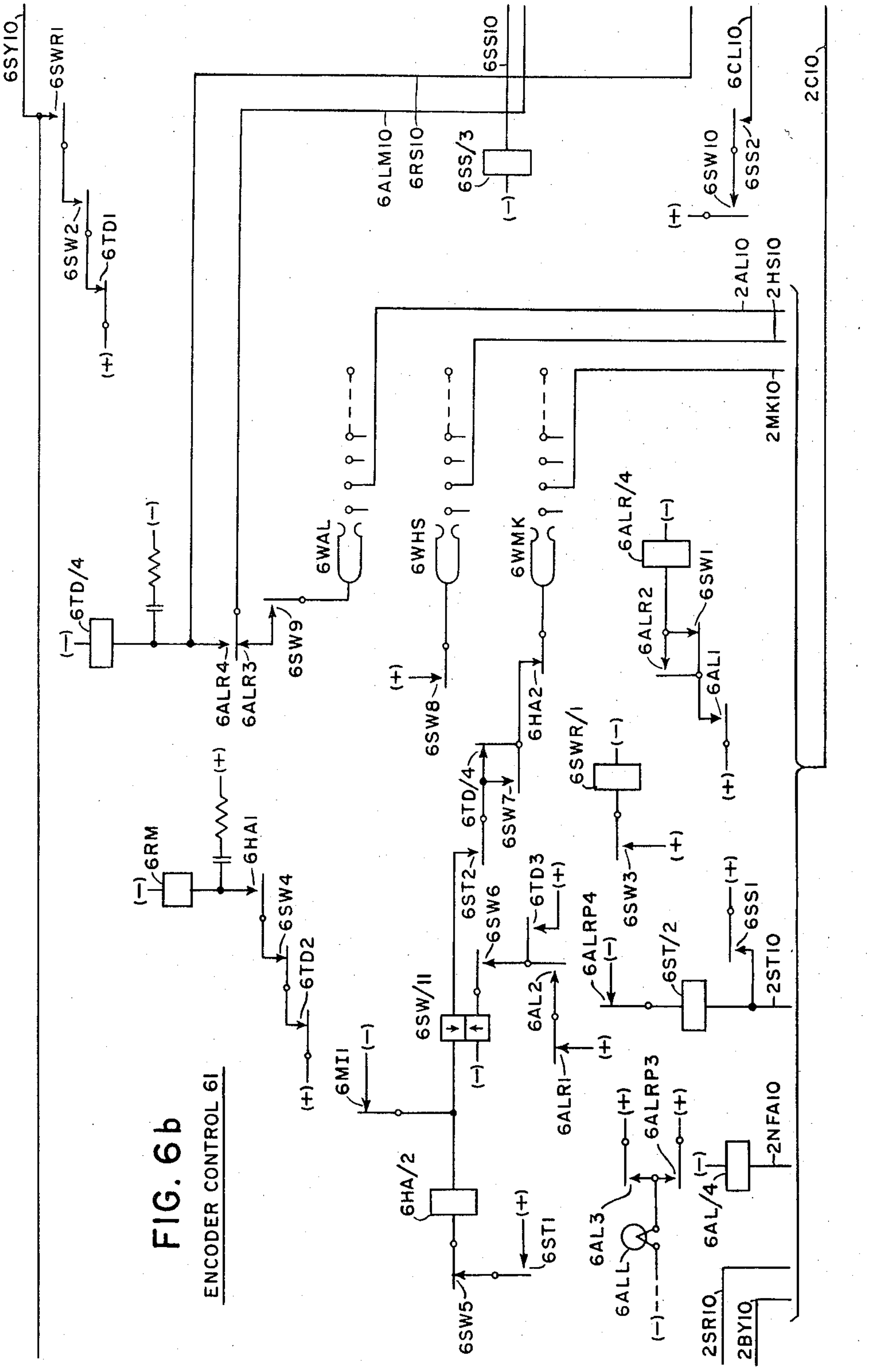

Figs. 6*a* and 6*b* show a schematic diagram of the encoder control; and

Figures 1, 7:
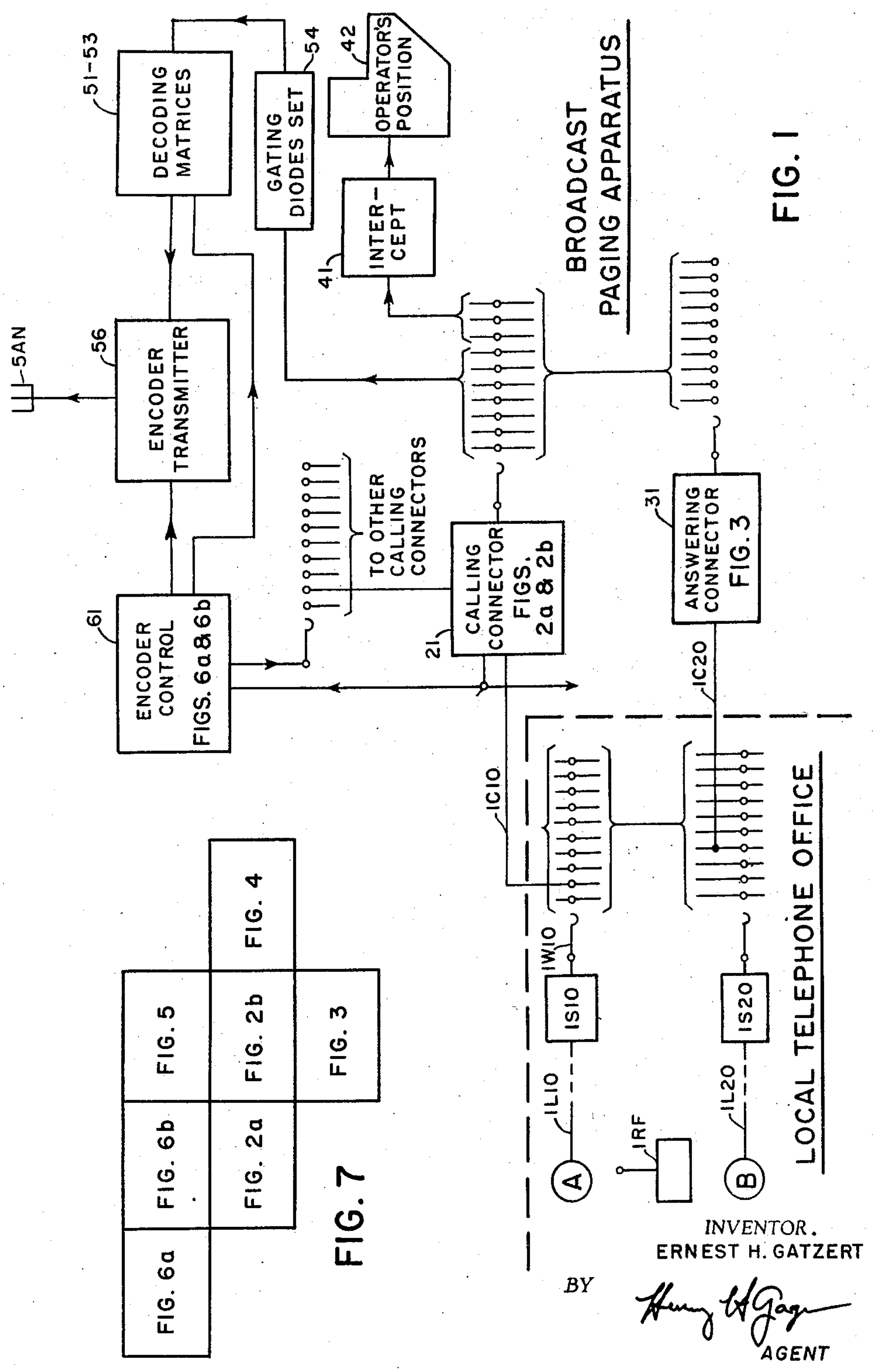

Fig. 7 shows the order in which Figs. 2–6 are to be oriented.

The apparatus in the following description of my invention is made to function from power supplied from various sources. A first power source is a battery having its most positive plate or terminal connected to ground. This plate is hereafter referred to as "ground" in the description and as (+) in the drawings. The other, most negative plate or terminal of the battery is referred to in the description as "battery" and in the drawings as (−). Another power source is low impedance tone supply which produces a four hundred cycle per second signal. One side of the source is connected to the above referred to ground, the other, ungrounded side being indicated as "dial tone" in both the drawings and description. The ungrounded tone supply conductor is also passed through an interrupter circuit of the well-known type and is delivered on a conductor indicated as "busy tone" both in the description and drawings at a frequency of 60 impulses per minute. The interrupter is also used for producing interrupted battery and ground signals, labeled "60 impulses per minute" or as required. Another tone source having a first, grounded side, and a second, ungrounded side which is passed through the interrupter, provides an interrupted 20 cycle per second signal hereinafter referred to in the description and drawings as "ringback tone."

In the following description, reference to apparatus shown in the drawings includes a single digit followed by an identifying letter or letters and digits. The prefix digit refers to the figure number in which the element is found, while the letters identify the element within the figure. The windings of multicontact relays are identified as indicated above and are followed by a slash and an additional digit or digits indicating the number of contacts on the relay. Thus, "2CB/2" refers to the calling bridge relay having two sets of contacts appearing in Fig. 2, and "2CB1" refers to a particular set of contacts on relay 2CB.

*General description*

Referring to Fig. 1, my invention is practiced in a system having a subsystem comprising a local telephone office of the conventional dial type, and another subsystem including a radio frequency transmitter and a plurality of receiving stations including 1RF.

The telephone office has a plurality of lines such as IL10 and IL20 connected thereto. Stations, such as A and B, respectively, are connected to each of the lines. To originate a paging call from a line such as IL10, the telephone at station A is removed from its cradle and thereafter a connection is extended by conventional methods to switching equipment within the office such as selector IS10. The selector is thereupon directly operated by manipulating a dial at station A, so that the selector's wiper set 1W10 is directly advanced to a special level, and thereafter advanced within that level into engagement with one of a plurality of terminal sets on which an idle one of a group of calling connectors, such as 21, is terminated. Calling connector 21 is assumed to have been seized in this manner.

The calling party at station A dials the directory number of the radio frequency station to be paged or signaled into calling connector 21. Consequently, the wiper set of connector 21 is directively advanced into engagement with a set of terminals corresponding to the directory number of the called radio frequency station such as 1RF.

Upon the directive operation of any of the calling connectors, means within the operated connector is effective for placing a marking signal on certain ones of the selected terminal set and for transmitting a start signal to encoder control 61, which is common to the group of calling connectors. In response to such a start signal, start means in encoder control 61 causes a rotary switch individual to encoder control 61 to hunt for and to be stopped on a set of terminals individually connected to the operated one of the calling connectors. Upon locating the terminal set connector 21, which is now demanding service, means within the encoder control transmits a single signal to connector 21. After the transmission of the signal, the encoder control switch is again operated and continues to scan the group of calling connectors so long as encoder control 61 continues to receive a start signal from any connector in the calling group. Each time the switch returns to the terminal set of calling connector 21, another signal is sent to that connector, if that connector is still demanding service.

Repeating means within connector 21 is operated in response to the intermittent signals received from encoder control 61 and is effective for transmitting a corresponding signal to one of the terminals in the set engaged by the wiper set of connector 21. The signal receiving terminal of the set engaged by the wipers of calling connector 21 is individually connected through a gating diode set 54 to decoding matrices 51—53 which are thereby energized. The selective energization of relays within the decoding matrices 51—53 is effective in response to the operation of the aforementioned start means within encoder control 61 for completing a circuit for selectively energizing encoder transmitter 56. Encoder transmitter 56 is thereupon effective for transmitting a single signal to individually energize radio frequency receiving station 1RF each time the signal repeating means within connector 21 is operated.

Returning to the consideration of connector 21, connector 21 includes means comprising a series of counting relays operative in response to each operation of its own signal repeating means. Upon the registration of a predetermined number of operations of repeating relay, the registering means is effective for removing the start signal from encoder control 61 and for removing the marking ground from the terminal set of the encoder control 61 rotary switch individual to connector 21. Thereafter the encoder control rotary switch may be operated in response to start signals from other calling connectors, but passes over the terminal set individual to calling connector 21. For this reason, the number of paging signals transmitted to station 1RF is limited to the number of operations of the repeating means within connector 21.

If encoder control 61 becomes overloaded by coincidental demands for service from a large number of calling connectors, the time interval between successive signals transmitted to connector 21 and, consequently, to radio frequency station 1RF becomes excessive. In order to prevent this, I provide means within the encoder control operative in response to the transmission of start signals from a predetermined number of ones of the calling connectors to encoder control 61 for transmitting a busy signal to all calling connectors. The seizure means within each calling connector is effective when such seizure means is in normal (idle) condition for marking that calling connector busy to the office switching equipment, so that no other calling connectors can be seized or operated. When encoder control 61 has taken care of the demands of the currently operated calling connectors the group busying means in encoder control 61 is disabled, so that the group busy signal is removed from all calling connectors. Consequently, idle ones of the calling connectors may be seized by paging parties and caused to directively operate the encoder transmitter 56 in the above-described manner.

Upon the receipt of a paging signal at stations such as 1RF, the paged party picks up a telephone in the local telephone office and thereby causes a connection to be extended to the office switching equipment such as selector IS20 in a conventional manner. The selector is thereafter directively operated by manipulating the dial at station B, so that selector IS20 is advanced to a particular level in which answering connectors, such as 31, are terminated. Thereafter selector IS20 is advanced until its wiper set engages the terminal set connected to an idle one of the answering connectors, in the next assumed case, 31. The paged party next manipulates the dial at station B in accordance with the directory number of station 1RF, so that the wiper set of answering connector 31 is advanced into engagement with the one of the terminal sets which is multiply connected to the one of terminal sets already selected by calling connector 21. Thereafter switchthrough means within connector 31 operates in response to a marking signal present on the selected terminal set by connector 21, so that paging and paged parties are connected to each other through the multiply connected terminal sets selected by connectors 21 and 31.

In the ordinary case, it is required that only one answering party at a time be allowed to be connected to any paging party. Consequently, the answering connector 31 is normally operative in response to a marking signal received from the selected terminal set and calling connector 21 for placing a busy marking signal on that terminal set and the terminal sets multiply connected thereto. In this manner, the switchthrough means within other answering connectors is prevented from thereafter extending connections from other telephone office stations to busy terminal sets.

However, it may be necessary in special cases to allow a conference type call, where a single one of the calling connectors and a plurality of answering connectors are interconnected through corresponding ones of the terminal sets. The paged radio frequency stations to which such service is to be given all have terminal sets located within special levels accessible to the answering connectors. When such a level is selected by answering connector 31 and its wiper set advanced into engagement with a busy terminal set, level marking means within connector 31 is operative in response to the operation of the busy test means within connector 31 for operating the connector 31 switchthrough means. The operation of the switchthrough means is effective, as in the case of the above-described regular call, for extending a connection from paged parties to the paging party.

*Originating a paging call*

Referring to Fig. 1, a first subsystem comprising a conventional local, dial telephone office is indicated. The office has a plurality of lines such as 1L10 and 1L20 connected thereto. Stations, such as A and B, respectively, are connected to each of the lines. To originate a call from a line such as 1L10, the telephone at station A is removed from its hookswitch, and thereafter a connection is extended by conventional methods to switching equipment within the office such as selector 1S10. The selector is thereupon directively operated by manipulating a dial at station A so that the selector's wiper set shown collectively as 1W10 is directively advanced into engagement with one of a plurality of terminal sets accessible from the selector. The office switching equipment is not described in detail here because its operation is well understood by those skilled in the art, and because the office switching equipment per se does not form a part of our invention.

Assuming that the person at station A on calling line 1L10 wishes to make a paging call, the signal transmitter at station A is manipulated so that selector 1S10 is directed to a particular level wherein a first plurality of special switching connectors, such as the calling connector 21 (shown in detail in Figs. 2*a* and 2*b*), are terminated. The conductors, such as those shown collectively as 1C10, incoming to each calling connector are terminated on one of the terminal sets within the special level. Upon the selection of the particular lever, the wiper set 1W10 of selector 1S10 is automatically advanced over the terminal sets within the level until the wiper set engages the terminal set of an idle calling connector. Assuming that the one shown in Figs. 2*a* and 2*b* is the first idle connector encountered, seizure of that connector thereafter takes place in the manner next described.

Figure 2A:
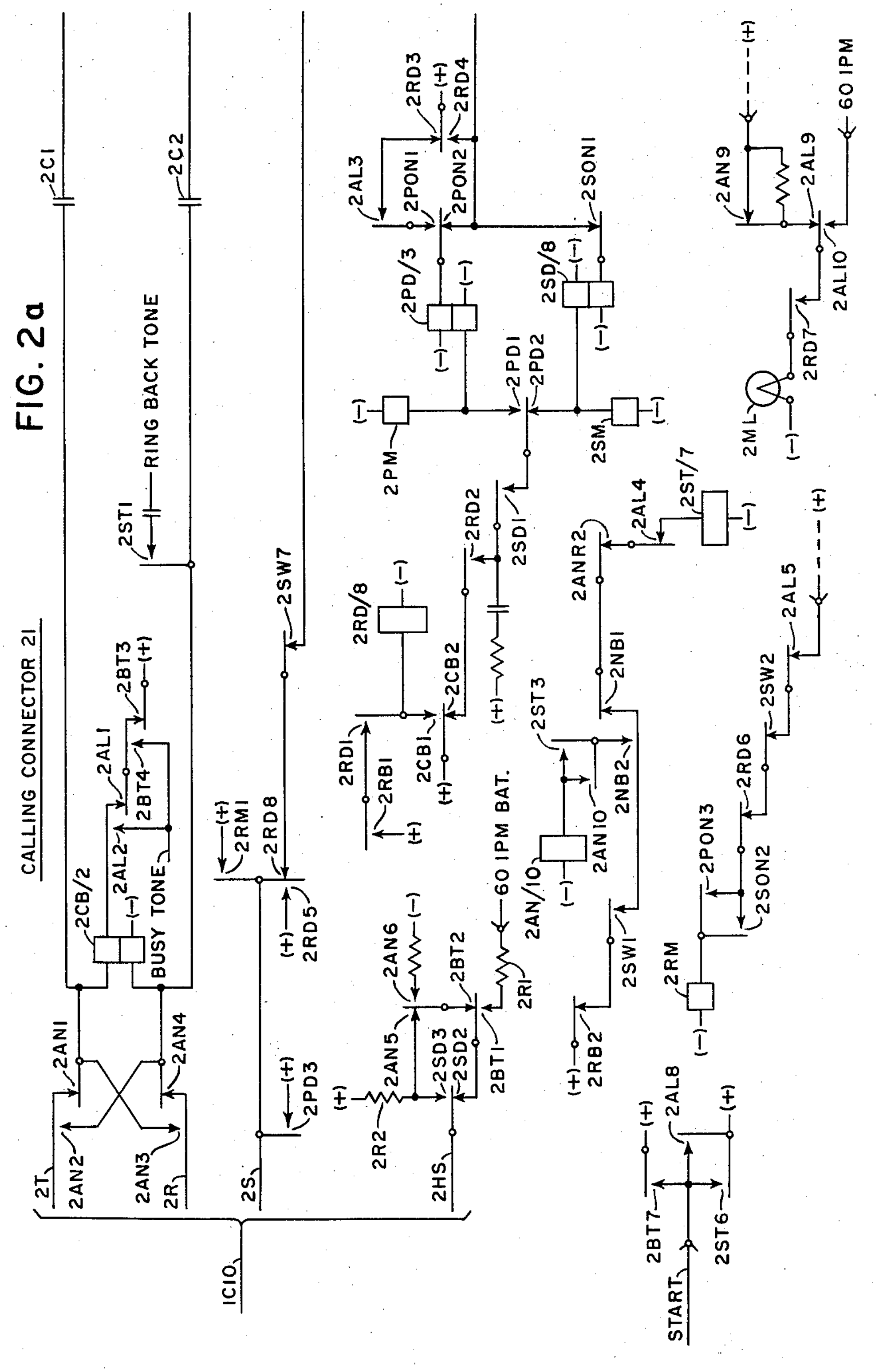
Figure 2B:
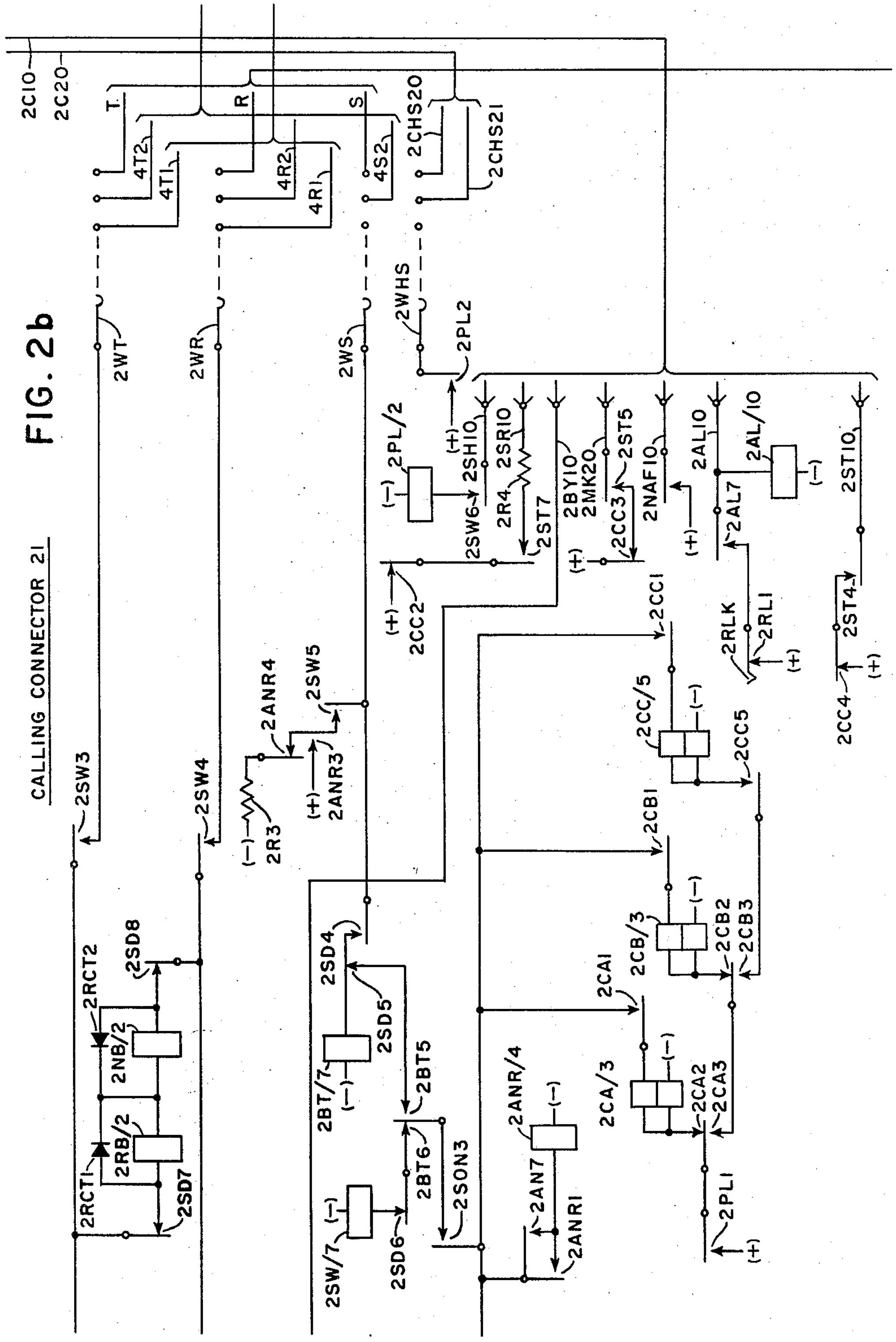

*Seizure of a calling connector.*—Referring to Figs. 2*a* and 2*b*, the extension of a connection to an idle connector is effective for completing a talking channel from the conductors on line 1L10 to the talking channel of the calling connector which includes conductors 2T and 2R. The conventional short including the dial interrupter contacts between the conductors of line 1L10 at station A is effective for completing an operating circuit for calling bridge relay 2CB. The circuit is traced from ground through break contacts 2BT3 and 2AL1, the upper winding of relay 2CB, break contacts 2AN1, conductor 2T, the corresponding conductors through selector 1S10 and line 1L10, apparatus including the impulsing dial contacts of station A, the other talking conductors of line 1L10 and selector 1S10, conductor 2R, break contacts 2AN4, and the lower winding of relay 2CB to battery. Relay 2CB thereupon operates to complete an obvious operating circuit for release delay relay 2RD at make contacts 2CB1.

The operation of relay 2RD is effective for preparing a holding circuit for itself at make contacts 2RD1. The operation of relay 2RD is further effective for preparing an energizing circuit for each of the primary and secondary advancing means of the connector comprising primary magnet 2PM and secondary magnet 2SM, respectively, at make contacts 2RD2. The operation of relay 2RD is further effective for placing a holding and busy marking ground on sleeve conductor 2S incoming conductors to the calling connector at make contacts 2RD5. Thereafter, the preceding switch train including selector 1S10 is held and the calling connector of Figs. 2*a* and 2*b* is marked busy in the conventional manner by virtue of the grounded 2S conductor.

The operation of relay 2RD is further effective for opening the subsequently described operating circuit for release magnet 2RM at break contacts 2RD6. The opertaion of relay 2RD is further effective for completing an energizing circuit for monitor lamp 2ML from ground through break contacts 2AN9 and 2AL9, make contacts 2RD7, and the filament of lamp 2ML to battery. Lamp 2ML thereupon glows in full brillance to indicate that a call is standing in on the connector.

The operation of relay 2RD is further effective for operating primary and secondary delay relays 2PD and 2SD, respectively. The operating circuit of relay 2PD is traced from ground through the contacts 2RD4, break contacts 2PON2, and the upper winding of relay 2PD to battery. The operating circuit for relay 2SD is traced from ground through make contacts 2RD4, break contacts 2SON1, and the upper winding of relay 2PD to battery.

The operation of relay 2PD is effective for completing an auxiliary ground supply circuit for incoming sleeve conductor 2S at make contacts 2PD3 for reasons to be set forth under the description of the interrupt operation. The operation of relay 2PD is further effective for preparing an operating circuit for primary magnet 2PM at make contacts 2PD1 and for opening an energizing circuit for secondary magnet magnet 2SM at break contacts 2PD2.

*Advance of the calling connector in its primary direction.*—The seizure process of the calling connector is now completed, and the connector is ready to receive trains of directive impulses from calling station A over incoming conductors 2T and 2R. Each impulse in such a train is caused by the conventional opening and reclosing of the impulsing dial contacts at the station. As a result, the above-described circuit for operating relay 2CB is opened and reclosed and relay 2CB releases and reoperates in response to each such impulse. At the conclusion of each impulse train, relay 2CB comes to rest in its operated condition. Relay 2RD, a slow release type, does not release during the time that impulses are being released by relay 2CB, even though the above-described operating circuit of relay 2RD is momentarily opened at make contacts 2CB1.

During the transmission of a first train of impulses to the calling connector, that is during the time that both relays 2PD and 2SD are operated, a circuit is completed upon each release of relay 2CB for energizing means including primary magnet 2PM for advancing the wiper set of the connector comprising wipers 2WT, 2WR, 2WS and 2WHS away from its normal position in a primary direction. The energizing circuit is completed from ground through break contacts 2CB2, make contacts 2RD2, 2SD1, and 2PD1, and the winding of magnet 2PM to battery. The battery-connected lower winding of relay 2PD is connected in parallel with magnet 2PM, so that the lower winding of relay 2PD is intermittently energized during the receipt of impulses at magnet 2PM.

Each energization of magnet 2PM is effective for advancing the above referred to wiper set one additional step away from its normal position. At any one of the advanced positions, the wiper set is opposite a corresponding level of the plurality of terminal sets to which the connector has access. The advance of a wiper set in its normal direction is further effective for operating the primary off-normal springs of the connector, so that the above referred to energizing circuit for relay 2PD is opened at break contacts 2PON2. Thereafter relay 2PD, a slow release type, is maintained in its operated condition by the intermittent energization of its lower winding in the above-described manner. This intermittent energization of the lower winding stops upon recepit of the last impulse of the first train, so that relay 2PD thereafter releases. At this point, the wiper set has come to rest opposite the selected level of terminal sets.

The release of relay 2PD is effective to prepare the connector to receive a second train of directive impulses from the calling line. To this end, the release of relay 2PD is effective for disconnecting magent 2PM and the lower winding of relay 2PD from the above-described impulsing circuit at make contacts 2PD1 and for preparing a circuit for energizing secondary magnet 2SM at break contacts 2PD2.

*Advance of the calling connector in its secondary direction.*—Upon the transmission of a second impulse train to the connectors, relay 2CB is again impulsed in its previously described manner and is effective for energizing means comprising magnet 2SM for advancing the connector wiper set in a secondary direction, i.e., into the selected level of terminal sets. The magnet is energized upon each release of relay 2CB over the following circuit: from ground through break contacts 2CB2, make contacts 2RD2 and 2SD1, break contacts 2PD2, and the winding of magnet 2SM to battery. The battery-connected lower winding of relay 2SB is connected in parallel with magnet 2SM, so that the lower winding of relay 2SD is intermittently energized during the transmission of the second impulse train to the connector.

Each energization of magnet 2SM is effective for advancing the above referred to wiper set away from its normal secondary position over successive ones of the terminal sets within the selected level and, at the end of transmission of the second impulse train, into engagement with the selected terminal set. Each terminal set within the plurality of sets accessible to each calling connector, such as one shown in Figs. 2*a* and 2*b* includes first and second talking channel terminals engaged by wipers 2WT and 2WR, a busy test terminal engaged by wiper 2WS and a signaling terminal engaged by wiper 2WHS.

Upon the first step of the wiper set away from its normal secondary position, secondary off-normal means comprising contacts are operated in order to open the above-traced operating circuit for relay 2SD at break contacts 2SON1. During the transmission of impulses, relay 2SD, a slow release type, is maintained operated by virtue of the above-described intermittent energization of its lower winding. After the second impulse train has been received, the above-described energizing circuit for magnet 2SM is opened and the lower winding of relay 2SD is deenergized. Relay 2SD thereafter releases.

*Busy test.*—In order to prevent more than one of the plurality of calling connectors from seizing a given terminal set, means is provided in each calling connector for testing for busy condition on the selected terminal set. If the terminal set is idle, so that the busy testing means fails to operate, switchthrough means within the connector is subsequently operated. The busy test is next described.

To any of the plurality of calling connectors being considered here, a busy condition on a terminal set is indicated by the presence of a first or second marking signal on the busy test terminal of the selected set. The first and second marking signals are (1) ground through any resistance up to the value of 1,000 ohms and (2) direct ground, respectively. Accordingly, when the second impulse train has been received and the wiper set has engaged a particular terminal set, a test operation of the engaged terminal set is carried out during the time that relay 2SD is still in its operated condition. When relay 2SD is operated, a circuit for operating busy test relay 2BT is prepared from battery through the winding of relay 2BT, make contacts 2SD4, and wiper 2WS to the engaged terminal. In the event that direct or resistance ground is present on the terminal engaged by wiper 2WS, relay 2BT operates. Thereafter, relay 2SD releases in the previously described manner and is effective in response to the operation of relay 2BT for completing a locking circuit for relay 2BT from ground through make contacts 2RD4, secondary off-normal contacts 2SON2 and 2BT5, break contacts 2SD5, and the winding of relay 2BT to battery.

The operation of relay 2BT is effective for connecting busy tone to the calling line 1L10 from Busy Tone conductor through make contacts 2BT4, break contacts 2AL1, and the upper winding of relay 2CB to conductor T2 and thence to line 1L10. The party at station A, upon bearing the tone, is informed that he should return his telephone to its hookswitch, so that the switch train may be released in a manner to be described presently. The operation of relay BT is further effective for connecting 60 i.p.m. battery through resistor 2R1 to incoming conductor 2HS at make contacts 2BT1 and break contacts 2SD2.

*Switchthrough.*—In the event that the terminal set engaged by the wiper set in the above-described manner fails to test busy, relay 2BT remains in its normal condition because its operating circuit is not completed. Upon release of relay 2SD in the previously described manner, a circuit is thereupon completed for operating switchthrough relay 2SW which is traced as follows: from ground through make contacts 2RD4 and 2SON2, break contacts 2BT6 and 2SD6, and the winding of relay 2SW to battery. Relay 2SW thereupon operates.

The switchthrough means comprising relay 2SW is effective for extending a connection from the incoming talking channel comprising incoming conductors 2T and 2R (to which the first calling line 1L10 has been connected) to the aforementioned talking channel terminals of the terminal set engaged by wipers 2WT and 2WR at make contacts 2SW3 and 2SW4. Blocking capacitors 2C1 and 2C2 are interposed between the incoming talking channel conductors and the wipers in order to separate the signaling channels including the talking conductor of the incoming end of the connector from the corresponding signaling channel at the outgoing end of the connector.

The operation of relay 2SW is further effective for marking the selected terminal set in a first particular manner, that is, by applying ground through 1,000 ohms to the one of the terminals in the selected set engaged by wiper 2WS. This circuit is traced from ground through 1,000 ohm resistor 2R3, break contacts 2ANR4, make contacts 2SW5, and wiper 2WS to the terminal. This 1,000 ohm ground has the effect of marking the terminal set and its corresponding multiply connected terminal sets accessible at other calling connectors busy to those other calling connectors within the above referred to first plurality. The same 1,000 ohm ground connected to multiply connected terminal sets accessible to answering connectors such as the one shown in Fig. 3 included in a second plurality serves as a signal to mark the terminal set as waiting or available. The operation of relay 2SW is further effective for opening a connection between conductor 2BY10 incoming from the encoder control shown in Figs. 6*a* and 6*b* and incoming sleeve conductor 2S at break contacts 2SW7 so that the application of a group-busy ground signal to conductor 2BY10 at the encoder control is without effect on the ones of the calling connectors having switchthrough means including relay 2SW in operated condition. The operation of relay 2SW has the further effect of connecting conductor 2HS10, which is incoming from the common encoder control circuit shown in Figs. 6*a* and 6*b*, to the input of signal repeating means comprising pulsing relay 2PL by connecting the winding of that relay to conductor 2HS10 at make contacts 2SW6. The use of relay 2PL is to be explained presently.

The operation of relay 2SW is further effective for operating start relay 2ST over a circuit which is traced from ground through break contacts 2RB2, make contacts 2SW1, break contacts 2NB1, 2ANR2, and 2AL4, and the winding of relay 2ST to battery. Relay 2ST thereupon operates.

It is noted at this point that the operation of relay 2ST is effective for applying ground to conductor 2MK10 (which extends to the encoder control) through break contacts 2CC3 and make contacts 2ST5. The operation of relay 2ST marks the last step in the process of seizing the selected one of the terminal sets and is effective for starting the operation of the above-mentioned encoder control circuit which is next described.

*Operation of the encoder control*

Referring to Fig. 1, means including the above-mentioned encoder control circuit shown in detail in Figs. 6*a* and 6*b* is common to the plurality of the calling connectors such as the ones shown in Figs. 2*a* and 2*b* and is effective in the manner presently set forth for energizing certain of the ones of the non-talking terminals selected by an operated one of the calling connectors. Upon the completion of the seizure of any one of the terminal sets to which the calling connectors have access, the operated one of the connectors places a demand signal on the encoder control circuit, thereby causing a switch within that circuit to seize the terminal set on which are terminated conductors such as 2HS10, 2MK10 and 2AL10 incoming to individual ones of the calling connectors.

*Starting the encoder control switch.*—Returning to the consideration of Figs. 2*a*, 2*b*, 6*a* and 6*b*, upon the operation of relay 2ST within the seizing one of the calling connectors, a demand signal in the form of a ground connection is placed on the common start lead 2ST10, which is connected to all calling connectors, at make contacts 2ST4. The application of ground to conductor 2ST10 is effective for energizing means comprising start relay 6ST for making the encoder control operative by completing an obvious circuit for start relay 6ST within the encoder control.

The operation of relay 6ST is effective for starting means comprising a single motion switch in operation by completing an operating circuit for hunt assist relay 6HA as follows: from ground through make contacts 6ST1, break contacts 6SW5, the winding of relay 6HA, and break contacts 6MI1 to battery. Relay 6HA thereupon operates with effects to be explained presently. The operation of relay 6ST is also effective for preparing a circuit for energizing switchthrough relay 6SW as follows: from battery through switch interrupter break contacts 6MI1, the upper winding of relay 6SW, make contacts 6ST2, break contacts 6TD4 and 6HA2, and wiper 6WMK.

The above referred to single motion switch within the encoder control is of the well-known rotary type having a set of wipers including 6WAL, 6WHS, and 6WMK, which may be advanced over first, second and third banks, respectively, of terminal sets. The switch is operated on a self-interrupting basis until the wiper set has been advanced into engagement with the terminal set on which are terminated the conductors incoming to the one of the operated calling connectors demanding service. To this end, the operation of relay 6HA is effective for completing a circuit for energizing rotary magnet 6RM of the switch which is traced as follows: from ground through break contacts 6TD2 and 6SW4, make contacts 6HA1, and the winding of magnet 6RM to battery. Magnet 6RM operates to open its own interrupter contacts 6MI1 and thereby release relay 6HA. Upon release of relay 6HA, the above-traced circuit for preparing relay 6SW is completed at break contacts 6HA2 and the above-traced operating circuit for magnet 6RM is opened in order to deenergize that magnet. The deenergization of magnet 6RM is effective for advancing the wiper set of the rotary switch into engagement with the next succeeding terminal set in the banks.

This process is repeated until the wiper set is moved into engagement with the terminal set individual to the calling connector demanding service. The latter terminal set is characterized by the connection of ground to the marking conductor 2MK10, which has been applied in the aforementioned manner by the operation of relay 2ST within the operated calling connector. Ground received over wiper WMK serves as a stop signal for the encoder control switch.

*Stopping the encoder control switch.*—The engagement of wiper 6WMK of grounded 2MK10 is effective upon the next occurring release of relay 6HA for completing a circuit for operating switchthrough relay 6SW over the above-traced circuit including the upper winding of relay 6SW. Relay 6SW operates to mark the end of the hunting operation of the rotary switch. Accordingly, the operation of relay 6SW is effective for opening the above-traced operating circuit for magnet 6RM at break contacts 6SW4 in order to prevent the magnet from being reenergized. Similarly, the operation of relay 6SW is effective for opening the energizing circuit for relay 6HA at break contacts 6SW5 in order to release relay 6HA. Thereafter, neither relay 6HA nor magnet 6RM can be energized until a dismiss signal is received by the encoder in a manner to be described presently.

The operation of relay 6SW is further effective for preparing a release circuit for itself including the lower winding of battery at make contacts 6SW6. The operation of relay 6SW is further effective for completing an obvious operating circuit for switchthrough repeater relay 6SWR at make contacts 6SW3. Relay 6SWR, a slow operate type, operates at some time thereafter with effects to be explained presently. The operation of relay 6SW is further effective for opening an operating circuit for alarm repeater relay 6ALR at break contacts 6SW1. The operation of relay 6SW is further effective for completing a holding circuit for itself including its upper winding and wiper 6WMK at make contacts 6SW7. The operation of relay 6SW is further effective for preparing a circuit for energizing wiper 6WAL at make contacts 6SW9.

The operation of relays 6SW and 6SWR is effective for transmitting a ground signal over conductor 6SY10 to the decoding matrices by connecting ground to that conductor through break contacts 6TD1, make contacts 6SW2, and 6SWR1 for purposes to be explained presently. The operation of relays 6SW and 6SWR is further effective for preparing an operating circuit for relay second alarm repeater relay 6ALRP at make contacts 6SW2, 6SWR1, and 6SW11. Finally, relay 6SW is included in start means operative for transmitting a signal for energizing relay 2PL within the operated one of the calling connectors demanding encoder control service, relay 2PL being effective for repeating signals to one of the non-talking pairs of terminals of the set selected by the presently considered one of the calling connectors with effects which are to be explained. The circuit for energizing relay 2PL is traced from ground through make contacts 6SW8, wiper 6WHS, conductor 2HS10, and, within the operated one of the calling connectors, make contacts 2SW6 and the winding of relay 2PL to battery. Relay 2PL therefore is operated to repeat ground signals incoming over wiper 2WHS at make contacts 2PL2. Other uses of relay 2PL are to be explained presently.

*Selective operation of the encoder transmitter*

Again referring to Fig. 1, it has been seen thus far that upon the selection of a particular terminal set by one of the calling connectors such as the one shown in detail in Figs. 2*a* and 2*b*, the encoder control 61 detailed in Figs. 6*a* and 6*b* transmits signals to be operated one of the calling connectors where the signals are repeated and sent to energize the one of the non-talking pair of terminals engaged by wiper 2WHS. Each such signaling terminal is multiply connected and available to a wiper 2WHS of any calling connection. Further, each signaling terminal is individual to one or ones of a plurality of radio frequency receivers within a different subsystem. The subsystem including the calling connectors is accordingly arranged so that the energization of any one such terminal is effective for controlling radio frequency transmitter 5TR10 shown in block form in Fig. 5 as part of encoder transmitter 56. Encoder transmitter 56 and transmitter 5TR10 are common to the plurality of calling connectors. Transmitter 5TR10, controlled in the manner to be described, is effective for signaling the radio frequency receiver corresponding to the selected terminal. To this end, each multiply connected signaling or transmitter controlling terminal is connected individually to the positive plates of diodes within a set of gating diodes, such as 54, each gating diode set being individual to one of the aforementioned signaling terminals. The other side of each diode within each set is individually connected to a certain one of a plurality of inputs of a corresponding decoding matrix. Thus, the negative sides of diodes 5D1, 5D2, and 5D3 are connected to ones of the input conductors to each of the decoding matrices A, B, and C, or 51, 52, and 53, respectively. With this arrangement of elements, the energization of any one terminal accessible to a 2WHS wiper of any one of the calling connectors is effective for energizing a unique combination of matrix input conductors. In the case chosen for illustration here, it is assumed that wiper 2WHS has been advanced to engage the one of the terminals to which conductor 2CHS20 is connected.

Of the various sets of decoding matrix relays, only decoding matrix A is shown in detail because decoding matrices B and C are substantially identical in function. In the contemplated system, it is necessary to energize one and only one input of each matrix in order to control the encoder transmitter 56. The energization of less or more than this number of inputs gives rise to an alarm condition, with results which are presently described.

Upon the energization of conductor 2CHS20 in the above-described manner, one of the relays in each matrix is operated. In the illustrated case, relay 5MA within decoding matrix A is operated over an obvious circuit. No other relay in matrix A is to be operated at this time. Similarly, appropriate relays within matrices B and C operate at this time. Upon the operation of one and only one relay in each of matrices A, B and C, a circuit is effective for completing a start signal circuit to the encoder control shown in Figs. 6*a* and 6*b* which operates sending start relay 6SS within the encoder control. This circuit is traced from battery through the winding of relay 6SS, conductor 6SS10, make contacts 5MA2 on now-operated relay 5MA, break contacts such as 5MB1 and 5MN1 arranged in a chain as indicated in matrix A, through conductor 6SYE10 corresponding contact sets in the decoding matrices B and C, conductors 6SY10, make contacts 6SWR1 and 6SW2, and break contacts 6TD1 to ground. Upon receipt of this ground signal at the winding of relay 6SS, relay 6SS operates to complete a locking circuit for start relay 6ST within the encoder control, so that the removal of a demand signal from conductor 2ST10 will not prevent a complete operation of the encoder transmitter.

The operation of relay 6SS is effective for opening at break contacts 6SS3 the aforementioned circuit prepared for operating relay 6ALRP. Relay 6ALRP is prevented from operating at this time because the operation of relay 6SS has indicated the absence of the particular type of alarm condition that means including relay 6ALRP is designed to indicate, i.e., the failure to receive a start signal from the decoding matrices.

The operation of relay 6SS is also effective to indicate to the encoder control that the matrices have been operated and therefore are ready to spill information into encoder transmitter 56. This operation is next described.

*Operation of the encoder transmitter*

The operation of encoder transmitter 56 is described in general terms only because the encoder transmitter, as such, does not form a part of my invention. Upon the operation of sending start relay 6SS in the above-described manner, a circuit is completed for transmitting a start signal to encoder transmitter 56 which is traced from ground through make contacts 6SW10 and 6SS2, conductor 6CL10, and the winding of encoder transmitter start relay 5TS to battery. Thereafter, means (not shown) within encoder control 56 is effective in response to the operation of relay 5TS for operating contacts 5MS1. Contacts 5MS1 in operated condition is effective for transmitting a signal over conductor 5MS10 to the decoding matrices for making the decoding matrices spill the stored information (i.e., the identity of the one of the radio frequency receivers to be signaled) into selective controlling means including a rotary switch and relays 5MDA through 5MDN within encoder transmitter 56.

As previously pointed out, one of the decoding relays in each of matrices A, B and C is operated upon the registration of the identity of the terminal set selected by the calling connector. Each matrix has a plurality of output leads, one of which is to be energized upon the energization of the corresponding decoding relays. Each output conductor in each matrix is connected to a corresponding one of a plurality of signal input conductors to encoder transmitter 56. Accordingly, when all matrices have been energized in the above-described manner, a unique combination including three conductors of encoder transmitter 56 is energized. The input conductors of encoder transmitter 56 are connected to the inputs of translating means such as the windings of a series of decoding relays 5MA through 5MN. Other means such as rotary switch 5SS10 is used for sequentially connecting battery to the other sides of the windings of each decoding relay. Switch 5SS10 is made operative by means not shown to scan each decoding relay once upon each start signal sent to the encoder transmitter. With this arrangement the decoding relays within the encoder transmitter corresponding to the operated ones of the matrix relays are operated in sequence. The decoding relays are effective for connecting corresponding ones of a series of control means such as 5CMA through 5CMN to a control point in radio frequency transmitter 5TR10. Transmitter 5TR10 is thereupon selectively operated to transmit a coded signal from antenna 5AN to all radio frequency receivers within the first subsystem. The transmitted signal, however, is unique to the receiver of the paged party.

In the illustrated case, it is assumed that the signal transmitted from antenna 5AN upon the selective energization of encoder transmitter 56 is effective for selectively signaling station 1RF, shown in Fig. 1. Upon receiving the signal unique itself, means at receiving station 1RF is effective for informing the party at that station that a paging call is standing in for his station. The paged party then uses the telephone system to complete the paging call in a manner to be described presently.

*Dismissing the encoder control*

Upon the completion of transmission of a complete radio frequency signal, means, not shown, within the encoder transmitter is effective for operating end-of-cycle means such as contacts 5EC1 within encoder transmitter 56. Contacts 5EC1, in turn, are effective for transmitting a ground, end-of-cycle signal to the encoder control over conductor 6RS10 to the encoder control shown in Figs. 6*a* and 6*b*. Apparatus within the encoder control, to be described next, is thereupon operated to release the encoder control from the one of the calling connectors demanding service and thereby to deenergize the encoder transmitter.

The ground, end-of-cycle signal over conductor 6RS10 is effective for completing an obvious circuit for operating encoder control dismiss relay 6TD. The resulting operation of relay 6TD is effective for opening the above-described circuit for operating relay 6SS at break contacts 6TD1. Relay 6SS thereupon releases with effects to be explained presently. The operation of relay 6TD is further effective for opening the previously described energizing circuit for rotary magnet 6RM at break contacts 6TD2 in order to prevent the energization of the magnet until the release process of the encoder control and encoder transmitter has been completed. The operation of relay 6TD is further effective for opening the above-described operating circuit for relay 6SW at break contacts 6TD4. However, make contacts 6SW7, which are in parallel with contacts 6TD4, cause relay 6SW to continue to be operated at this time.

The operation of relay 6TD is further effective for completing the previously mentioned release circuit for relay 6SW at make contacts 6TD3. As previously pointed out, relay 6SW is operated and held operated by current flowing through its upper winding. The release circuit for relay 6SW includes the lower winding of relay 6SW and is effective for differentially energizing the lower winding with respect to the upper winding. The relay 6SW release circuit is traced from ground through make contacts 6TD3 and 6SW6, the lower winding of relay 6SW to battery. Upon the differential energization of both windings of relay 6SW, relay 6SW releases with effects which are to be explained presently.

Returning to the consideration of relay 6SS, the release of relay 6SS is effective for opening the previously referred to locking circuit for relay 6ST at make contacts 6SS1. Thereafter, relay 6ST may remain operated by virtue of demand signals placed on start conductor 2ST10 by operated ones of the calling connectors. The release of relay 6SS is further effective for removing the start signal circuit for encoder transmitter 56 at make contacts 6SS2, so that encoder transmitter 56 is deenergized.

The release of relay 6SW10 is effective for re-preparing the operating circuit for alarm repeater relay 6ALR at break contacts 6SW1. The release of relay 6SW is further effective for opening the operating circuit of relay 6SWR. Relay 6SWR thereafter releases with effects which are to be explained presently. The release of relay 6SW is further effective for re-preparing the operating circuits of magnet 6RM and relay 6HA at break contacts 6SW4 and 6SW5, respectively. The release of relay 6SW is further effective for opening the above-traced release circuit and the operating and hold circuit for relay 6SW at make contacts 6SW6 and 6SW7, respectively. The release of relay 6SW is further effective for opening the above-traced energizing circuit for pulsing relay 2PL within the one of the calling connectors demanding service at make contacts 6SW8. The release of relay 6SW is further effective for opening the above-traced energizing circuit for wiper 6WAL and the start circuit for the encoder transmitter at make contacts 6SW9 and 6SW10, respectively.

The release of relays 6SW and 6SWR is effective for opening the above-traced energizing circuit for relay 6SS at make contacts 6SW2 and 6SW1. The release of relays 6SW and 6SWR is further effective for opening the aforementioned prepared operating path of relay 6ALRP at make contacts 6SW11, 6SWR1, and 6SW2.

After the removal of the energizing signal from encoder transmitter 56, the above referred to end-of-cycle means within the encoder transmitter removes ground from the winding of end-of-cycle relay 6TD at make contacts 5EC1, so that that relay may subsequently release. In the process of releasing encoder control 56, 6TD is the last relay to be released owing to the fact that its winding is shunted by a high capacitance-resistance circuit also connected to battery. As a result, the reapplication of ground to the start relay 6ST winding prior to the complete dismissal of the encoder transmitter is without effect, because the operation of the rotary selecting switch is prevented until the energizing circuit for rotary magnet 6RM is recompleted at break contacts 6TD2. Similarly, relay 6SW cannot be reoperated because its operating circuit is opened at break contacts 6TD4. Similarly, relay 6SS cannot be reoperated because its operating circuit is opened at break contacts 6TD1.

The above-described release of relay 2PL within the calling connector is effective for deenergizing the transmitter control terminal selected by the operated one of the calling connectors by opening the ground connection to that terminal at make contacts 2PL2. The deenergization of the selected terminal is effective for removing the identifying signal from the inputs to the various decoding matrices, thereby releasing the operated ones of the decoding matrix relays.

If the paging call placed by the operated one of the calling connectors has been answered at this time, the encoder control continues to respond to subsequent demand signals from others of the plurality of calling connectors and passes over the answered calling connector. This process is to be more fully explained presently. In the event that the paging call mentioned above has not been answered, the encoder control rotary switch is advanced in the above-described manner in response to the continued presence of a demand signal on conductor 2ST10 until the switch again returns to the terminal set individual to the above discussed connector. In either event, the common encoder transmitter is again selectively energized until all paging calls have been answered, and the paged party radio frequency receiver is signaled for a fixed number of times in the manner next set forth.

*Limiting the number of coded signals transmitted to a paged station*

In order to prevent the operated calling connector from indefinitely continuing to transmit signals to the encoder transmitter and therefore signaling of the radio link stations, I provide means within each calling connector for counting or registering the number of complete cycles of signals transmitted over the encoder transmitter 56 in response to the service demand signal of the individual calling connector. Upon the registration of a predetermined number of such completed signals (three, in the preferred embodiment of my invention) the registering means within the calling connector is operative for removing the start condition signal from the encoder control, and for removing the marking signal from the encoder control rotary switch terminal set individual to the calling connector. For this reason, the operated calling connector no longer sends demand signals to the encoder control and the encoder control switch passes over the terminal set individual to the connector when the encoder control is activated in response to demand signals originating at another one of the calling connectors.

In the preferred embodiment of my invention, pulsing relay 2PL in addition to its function of repeating signals to the decoding matrices 51—53 has the function of repeating the signals to registering means within the calling connector shown in Figs. 2*a* and 2*b* including counting relays 2CA, 2CB and 2CC. It is next assumed that the calling connector has operated the encoder control in the above-described manner and that the encoder control sends first, second and third ground signals over conductor 2HS10 to operate relay 2PL first, second and third times, in the course of selectively energizing encoder transmitter 56 first, second and third times.

The first operation of relay 2PL is effective for closing a first step operating circuit for two-step relay 2CA from ground through make contacts 2PL and the lower winding of relay 2CA to battery. Relay 2CA thereupon operates to the point where make contacts 2CA1 are closed. Closing contacts 2CA1 prepares a second step operating circuit for relay 2CA which is traced from ground through make contacts 2RD4 and 2CA1 and the upper and lower windings of relay 2CA to battery. The fact that the upper winding of relay 2CA is shorted out during the time that contacts 2PL1 are closed prevents relay 2CA from operating through its second step until the first complete set of signals has been transmitted by encoder transmitter 56 and relay 2PL subsequently released in the above-described manner.

Upon the release of relay 2PL, relay 2CA operates through its second step, thereby preparing a first step operating circuit for relay 2CB at make contacts 2CA3. Similarly, the second step operation of relay 2CA is effective for opening its own first step operating circuit at break contacts 2CA2.

The second and third operations of relay 2PL result in the advance of relays 2CB and 2CC through first and second steps in a manner similar to that described in connection with relay 2CA. A detailed description of this operation is omitted because the steps involved are obvious in view of the description set forth in connection with relay 2CA. Upon the second step operation of relay 2CC, three full codes of signals have been transmitted by encoder transmitter 56, and at this point it is desired to prevent further transmission of signals.

The second step operation of relay 2CC is effective for disconnecting the encoder control start signal from conductor 2ST10 at break contacts 2CC4. The operation of relay 2CC is further effective for removing the marking ground signal from conductor 2MK10 at break contacts 2CC3 in order to open the above-described operating circuit for relay 6SW within the encoder control. As a result of opening the circuit for operating relay 6SW, a subsequent advance of the switch wiper set into engagement with the terminal set individual to the calling connector shown in Figs. 2*a* and 2*b* (in the course of the encoder control's search for another of the calling connectors which is demanding service) prevents the switch in the encoder control from being stopped in the previously described manner on terminal set individual to the calling connector shown in Figs. 2*a* and 2*b*. Consequently, the encoder control is without effect with respect to relay 2PL after relay 2CC has been operated, and signals are not sent at this time from the calling connector shown in Figs. 2*a* and 2*b* to the decoding means and encoder transmitter 56.

The operation of relay 2CC is further effective for removing resistance ground from conductor 2SR10 at break contacts 2CC2 for reasons which are next explained.

*Evening out the intersignaling time*

From the preceding description, it is obvious that if a plurality of calling connectors demand service from the encoder control at the same time, the encoder control sequentially causes each such calling connector to directively operate encoder transmitter 56 in accordance with the order of appearance of conductor sets individual to each such calling connector on the terminal sets of the encoder control switch bank. It is further apparent that each full transmission of a code of ringing signals from encoder transmitter 56 requires a finite time interval. For this reason, the time required to signal any particular radio frequency receiving station, such as 1RF, is greater if a large number of calling connectors require the service of the encoder control at any one time than the time interval required to accomplish the same three complete signaling operations if only one calling connector is demanding service. Such time interval differences could interfere with the efficiency of the system. Therefore, I have provided means for preventing more than a predetermined time interval to elapse between successive signals to any radio frequency station by limiting to a fixed maximum the number of calling connectors receiving service at any one time from the encoder control.

I accomplish this by providing means including group busying means including guard relay 6GD and guard repeater relay 6GDR within the encoder control operative for making all idle ones of the calling connectors busy after a predetermined number of calling connectors have been taken for use and demand service. To this end, I provide means such as break contacts 2CC and make contacts 2ST7 within each calling connector for indicating to the group busying means the presence of a service demand within the individual ones of the calling connectors. The service demand signal is a resistance ground applied through conductor 2SR10 and break contacts 6FL1 to the battery-connected winding of relay 6GD when any calling connector, such as the one shown in Figs. 2*a* and 2*b*, has been operated and before the three successive signals have been sent to the required radio frequency station. The current required to operate relay 6GD is provided only after a predetermined number of calling connectors have placed resistance ground signals on conductor 2SY10 in parallel. In the preferred embodiment of my invention, this number is chosen arbitrarily as four.

It is next assumed that four calling connectors are demanding encoder control service and that relay 6GD has operated over the above-described circuit. The operation of relay 6GD is effective at make contacts 6GD1 for operating repeater relay 6GDR.

The operation of relay 6GDR is effective for applying a busy indicating ground signal through make contacts 6GDR2 to conductor BY10, which in turn is connected to the incoming busy test terminals of various ones of the calling connectors. If it is assumed for the moment that the calling connector shown in Figs. 2*a* and 2*b* is in idle condition, this connection is traced from conductor 2BY10 through break contacts such as 2SW7 and 2RD8 to incoming sleeve conductor 2S.

From the above description it is seen that the application of ground to conductor 2BY10 in any idle connector is effective for making the incoming terminal set of the idle connector appear busy to the aforementioned switching equipment such as selector 1S10 within the telephone system. For this reason, ones of the subscribers wishing to place paging calls after relays 6GD and 6GDR have operated will be unable to make the office switching apparatus establish connections from their calling telephone stations to any of the calling connectors.

When the above-described counting mechanism has registered three complete operations in any one of the four calling connectors demanding service of the encoder control, the group busying means is made ineffective in the manner next set forth. If it is assumed that the calling connector shown in Figs. 2*a* and 2*b* has completed its signaling operation, as indicated by the operation of relay 2CC, relay 2CC in operated condition is effective to reduce by one the number of resistance ground signals applied to the winding of relay 6GD by opening the resistance ground connection within itself at break contacts 2CC2. Relay 6GD is subsequently released in a manner to be described presently. Thereafter, relay 6GD within the encoder control can be reoperated when four calling connectors again are demanding service of the encoder control at the same time.

Returning to the consideration of the encoder control and particularly of relays 6GD and 6GDR, the operation of relay 6GDR is further effective at make contacts 6GDR4 for starting the common interrupter (not shown). The interrupter is of the type well known to those skilled in the telephone art and effective to supply 10 and 120 impulses per minute ground signals over conductors labeled 10IPM and 120IPM, respectively.

I provide means including relay 6SY effective for extending conductor 120IPM to the battery-connected winding of flash relay 6FL at make contacts 6SY1. Assuming that a ground signal is present on conductor 120IPM at the time make contacts 6GDR1 are closed by the operation of relay 6GDR, the upper and lower windings of relay 6SY are differentially energized in order to prevent that relay from operating. The circuit for energizing the lower winding is traced from ground through make contacts 6GD3 and the lower winding of relay 6SY to battery, while the circuit for energizing the upper winding is traced from conductor 120IPM through make contacts 6GDR1, break contacts 6SY2 and the upper winding of relay 6SY to battery. With this arrangement, relay 6SY is first operated until a complete 120IPM ground signal is received from conductor 120IPM. Relay 6FL follows the 120IPM signals received from the interrupter and is effective for opening the above-described operating circuit of relay 6GD, which thereupon releases and reoperates upon the next release of relay 6FL so long as four of the calling connectors are demanding encoder control service. In order to hold the group busying means including relay 6GDR in operated condition during the time that relay 6GD is released, relay 6FL is further effective for closing a holding circuit for slow release type relay 6GDR at make contacts 6FL1. With this arrangement, relay 6GDR is alternately held operated by relays 6GD and 6FL until one of the four calling connectors demanding service of the encoder control stops transmitting a signal over conductor 2SY10.

In the event that one or more of the four ones of the calling connectors has ceased to demand service during the interval when relay 6GD1 is released, the resulting removal of resistance ground from conductor 2SR10 prevents relay 6GD from being reoperated upon the release of relay 6FL. As a result, relay 6GDR releases following the release of relay FL.

The release of relay 6GDR is effective for removing ground from conductor 2BY10 at make contacts 6GDR2 in order to remove the above-described busy condition from the incoming sleeve terminals of the idle ones of the calling connectors. Thereupon the switching equipment within the office is capable of extending connections from subscribers' stations to idle ones of the calling connectors.

The release of relay 6GDR is further effective for opening the above-described operating circuit for relay 6SY at make contacts 6GD3, so that relay 6SY releases. The release of relay 6GDR is further effective for removing ground from the start conductor leading to the interrupter and for disconnecting conductor 120IPM from the winding of relay 6FL at make contacts 6GDR4 and 6GDR1, respectively.

*Answering a paged call*

Returning to that point in the above description where encoder transmitter 56 has been operated and a signal sent to one of the radio frequency responsive stations, the paged party, upon the receipt of a signal at his station receiver, such as 1RF, responds by calling into the special switching equipment from any telephone in the system. In the case chosen for illustration, it is assumed that the subscriber picks up the telephone at station B and thereby causes a connection to be extended to the switching equipment such as selector 1S20 in the conventional manner. The selector is directively operated by manipulating the dial at station B to cause selector 1S20 to select, and thereby to extend a connection to an idle one of a second plurality of answering connectors such as the one shown in Fig. 3. Thereafter the calling station B dial is further manipulated to cause the answering selector wiper set to engage the particular one of the multiply connected terminal sets accessible to the second plurality (answering) connectors having a designation corresponding to the directory number of the paged party's receiver 1RF. The terminal sets accessible to the answering connectors are also multiply connected to corresponding terminal sets which are accessible from the above-described first plurality (calling) connectors.

Thus far in the description no indication has been given of the exact terminals selected either by the calling and answering connectors taken by the paging and paged parties at station A and station B, respectively. This aspect of the system is now explained in terms of the foregoing description.

As indicated in the foregoing description, the calling connectors have access to a finite number of sets of terminals. In the contemplated system, one set of terminals is provided for each radio frequency receiver station within the above referred to first subsystem. Further, the digits used to direct the calling and answering connectors into engagement with each terminal set correspond to the directory number of the paged, first subsystem station. Thus a paging party, wishing to contact station 32, directs the conventional switching apparatus within the office to select an idle calling connector by dialing a first (calling) predetermined access code, and upon reaching the calling connector, proceeds to dial the directory number, that is, the digits "3" and "2" of the paged party into the calling connector. Thereupon the paging party has extended a connection from his station to a talking channel including the multiply connected ones of the terminals engaged by wipers 2WT and 2WR of the calling connector. The encoder transmitter is also operated in the above-described manner at this time.

The paged party, upon receiving a signal from station receiver 1RF, dials a second (answering) predetermined access code to direct the conventional switching apparatus within the telephone office to select an idle one of the answering connectors. Upon reaching the answering connector, the answering party at station B dials his own first subsystem station directory number (in this case, "32") in order to advance the wiper set into engagement with the set of terminals corresponding to the ones engaged by the calling connector and to extend a talking connection from station B to the talking channel ones of the selected terminal set. Since both calling and answering connector wiper sets have been directed to multiply connected terminal sets, a talking connection is completed between the paging and paged parties. It is obvious that within any time interval as many paging connections can be completed as there are pairs of calling and answering connectors, if it is assumed that there are more terminal sets accessible to the connectors than there are connectors in any one plurality. The operation of the apparatus used to answer the call is next described in detail.

Figure 3:
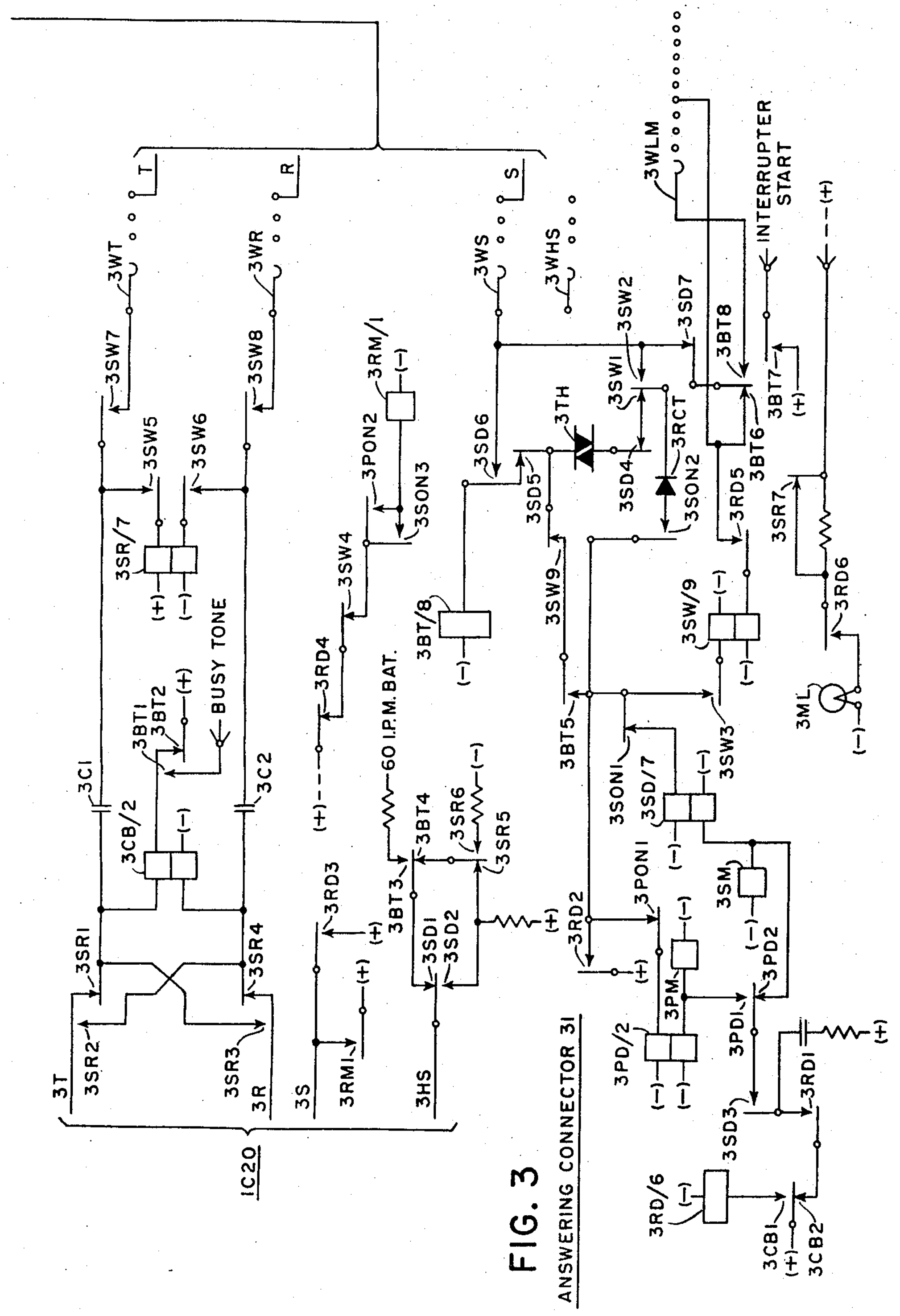
Fig. 3 shows a schematic diagram of an incoming answering connector.
Figure 4:
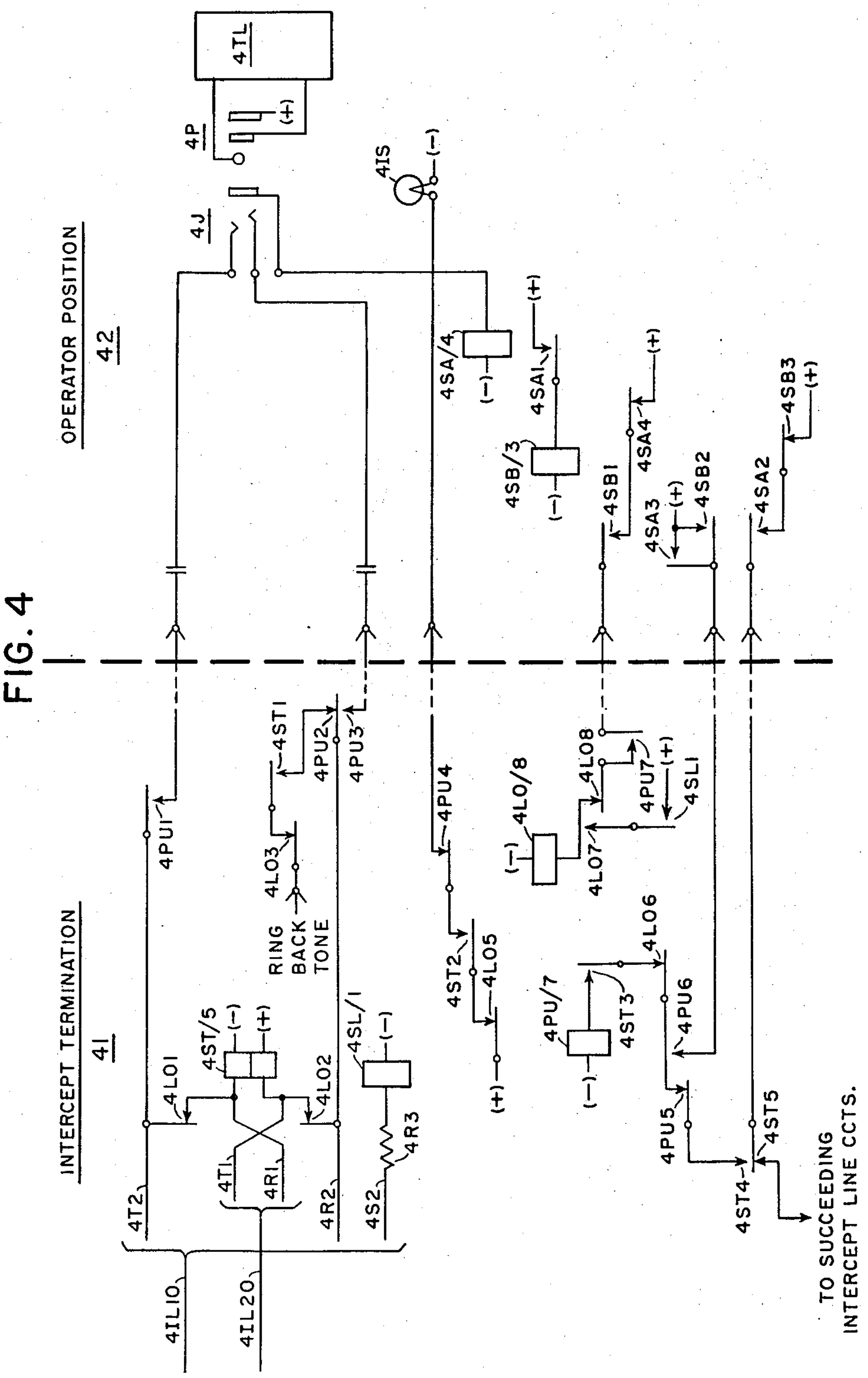
Fig. 4 shows schematic diagrams of an intercept termination and an intercept answering device, respectively.
Figure 5:
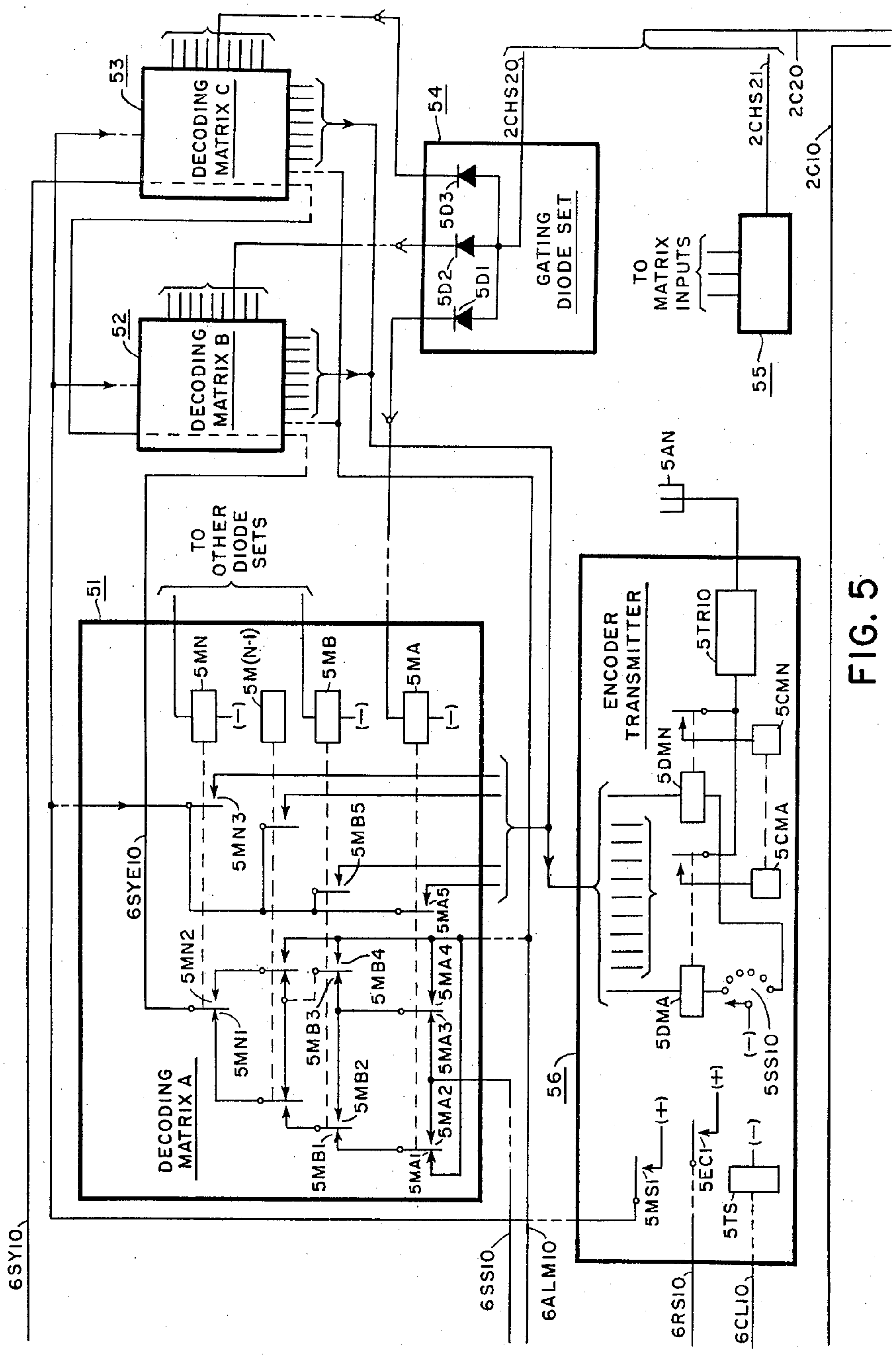
Fig. 5 shows diagrams of the decoding matrices and encoder transmitter, and diode sets.

*Seizing the answering connector.*—Referring to Fig. 1, it is assumed that the station telephone has been removed from its hookswitch, that a connection has been extended to selector 1S20, and that selector 1S20 has been directively operated to extend a connection from calling station B to the incoming conductors shown collectively as 1C20 of the hitherto idle answering connector shown in Fig. 3. Upon the extension of such a connection, an operating circuit for calling bridge relay 3CB is completed. The circuit is traced from ground through break contacts 3BT2, the upper winding of relay 3CB, break contacts 3SR1, conductor 3T, the talking conductors of the office switching equipment and line 1L20, the station telephone including dial contacts at station B, the other conductors of line 1L20 and selector 1S20, conductor 3R, break contacts 3SR4, and the lower winding of relay 3CB to battery. Relay 3CB thereupon operates.

The operation of relay 3CB is effective for closing an obvious circuit for operating release delay relay 3RD at make contacts 3CB1. Relay 3RD thereupon operates. The operation of relay 3RD is effective for completing a circuit for energizing monitor lamp 3ML at make contacts 3RD6. The operation of relay 3RD is further effective for preparing an operating circuit for relay 3SW at make contacts 3RD5. The operation of relay 3RD is further effective for opening the operating circuit for release magnet 3RM at break contacts 3RD4. The operation of relay 3RD is further effective for completing a circuit for grounding incoming sleeve conductor 3S at make contacts 3RD3 in order to hold the preceding switching equipment in operated condition under the control of the answering connector.

The operation of relay 3RD is further effective for preparing an impulsing circuit for primary and secondary magnets 3PM and 3SM, respectively, at make contacts 3RD1. The operation of relay 3RD is further effective for completing operating circuits for primary and secondary delay relays 3PD and 3SD. The operating circuit of relay 3PD is traced from ground through make contacts 3RD2, break contacts 3PON1, and the upper winding of relay 3PD to battery. The operating circuit of relay 3SD is traced from ground through make contacts 3RD2, break contacts 3SON1, and the upper winding of relay 3SD to battery. Both relays 3PD and 3SD thereupon operate.

The operation of relay 3PD is effective for preparing an energizing circuit for primary magnet 3PM at make contacts 3PD1, and for opening an operating circuit for secondary magnet 3SM at break contacts 3PD2. Upon the operation of relays 3PD and 3SD, the answering connector is ready to receive first and second trains of directive impulses from calling line 1L20.

*Primary advance of the answering connector.*—Relay 3CB responds to trains of directive impulses in exactly the same manner as relay 2CB described in connection with the calling connector. In response to each release of relay 3CB during the transmission of the first train of impulses, a circuit is completed for energizing magnet 3PM which is traced as follows: from ground through break contacts 3CB2, make contacts 3RD1, 3SD3, and 3PD1, and the winding of magnet 3PM to battery. Each energization of magnet 3PM is effective for advancing the wiper set of the answering connector including wipers 3WT, 3WR, 3WS, and 3WHS, one additional step away from the wiper set's normal position in the primary direction.

The first step taken by the wiper set is effective for operating primary off-normal means including various spring contact sets. Thus the above-described operating circuit for relay 3PD is opened at break contacts 3PON1. In order to prevent relay 3PD from releasing at this time, the lower, battery-connected winding of relay 3PD is placed in parallel with magnet 3PM. As a result, the lower winding of relay 3PD is intermittently energized during the transmission of the first impulse train to the connector. Relay 3PD is a slow release type, so that it remains operated during the time that magnet 3PM is being intermittently energized. Upon the termination of the transmission of impulses of the first train, relay 3CB comes to rest in its operated condition, thereby opening the above-described energizing circuit for magnet 3PM and the lower winding of relay 3PD. Relay 3PD thereupon releases because both its upper and lower windings are deenergized at this time.

At this point the wiper set of the answering connector has been advanced to a point opposite the required one of the levels of the plurality of terminal sets accessible to the answering connectors. Relay 3PD has been released, and relay 3SD is operated. The answering connector is now in condition to receive a second directive train of impulses.

*Secondary advance of the answering connector.*—The repeated release and reoperation of relay 3CB during the transmission of a second impulse train to the answering connector is effective for completing an energizing circuit for means comprising secondary magnet 2SM upon each release of relay 3CB for advancing the answering connector wiper set in a secondary direction. The circuit is traced from ground through break contacts 3CB2, make contacts 3RD1 and 3SD3, break contacts 3PD2, and the winding of magnet 3SM to battery. Each energization of magnet 3SM is effective for advancing the wiper set of the answering connector one additional step away from its secondary normal position and into engagement with the next succeeding terminal set within the selected level.

The advance of the wiper set away from its normal secondary position is effective for operating secondary off-normal means including various contact spring sets. As a result of the operation of the secondary off-normal means, the above-described operating circuit for relay 3SD is opened at break secondary off-normal contacts 3SON1. In order to maintain relay 3SD operated during the transmission of the remainder of the impulse as in the second train, the lower, battery-connected winding of relay 3SD is connected in parallel with magnet 3SM, so that relay 3SD is intermittently energized during the transmission of the remainder of the impulses as in the second train. Relay 3SD is a slow release type, so that it does not release during each momentary deenergization of its lower winding between impulses. Upon the transmission of the final impulse in the train, relay 3CB comes to rest in its operated position, so that the above-described energizing circuit for magnet 3SM and the lower winding of relay 3SD is opened at break contacts 3CB2. Magnet 3SM therefore remains deenergized, and relay 3SD then releases after a slight delay. At this point the wiper set has been advanced to engage the required terminal set within the plurality of sets accessible to the answering connectors and calling connectors. As in the case of the above-described calling connectors, each terminal set accessible to one of the answering connectors, such as the one shown in Fig. 3, includes first and second talking channel terminals (engaged by wipers such as 3WT and 3WR) and a busy test terminal (engaged by a wiper such as 3WS).

*Busy test and switchthrough of an answering connector*

The foregoing description has set forth how one of the calling connectors, upon selecting an idle terminal set, marks the seized terminal set and the corresponding terminal sets multiply connected thereto in a first manner by applying a 1,000 ohm ground to the one of the non-talking terminals engaged by wiper 2WS of the terminal set selected by the calling connector shown in Fig. 2. This 1,000 ohm ground signal on the corresponding, multiply connected terminals within a set accessible to the answering connectors indicates to an operated one of the answering connectors landing on that terminal set that a calling connector has been advanced into engagement with a multiply connected terminal set and is waiting for an answering connector to complete the call. If the above-described answering connector of Fig. 3 encounters such a condition, switchthrough means within the connector is made operative, so that a talking connection is completed between the talking conductors incoming to the operated ones of the calling and answering connectors by way of the talking ones of the terminal sets engaged by the wiper sets of those calling and answering connectors. This operation is to be described presently.

If, on the other hand, the operated one of the answering connectors has been advanced to engage a terminal set on which a paging call between a pair of calling and answering connectors is already in progress, the second answering connector is to be prevented from interrupting the already established connection. Accordingly, such a busy condition is indicated by the presence of direct ground on the one of the terminals engaged by wiper 3WS. The ground potential is applied on that terminal in a manner to be described presently by the calling and answering connectors already connected to the terminal set. In order to determine whether or not the engaged terminal set is busy, each answering connector is provided with busy test means comprising relay 3BT immediately operative upon the engagement of the terminal set for detecting the presence of such a ground. The busy test means in operated condition is effective for preventing the operation of the switchthrough means within the answering connector in order to prevent an intrusion on the established connection, and for applying busy tone to the line extended to that answering connector.

There is a third possible condition of a terminal set upon the selection of the set by an answering connector, and that is this: the terminal set engaged by the wiper set of the operated answering connector is not then engaged by any other one of the calling or answering connectors. Under these conditions, the operated one of the answering connectors cannot complete a paging call by engaging that particular terminal set. Such a terminal set is unmarked, that is, the terminal engaged by wiper 3WS has no potential at all standing thereon. In this event it is required that the switchthrough means within the operated one of the answering connectors be prevented from operating and that busy tone be applied to the one of the lines extended to the operated answering connector. All three of the operations of the answering connector are next described in detail.

*Busy test.*—Assuming first that the selected terminal set has direct ground connected to the busy test terminal of the selected set, that is, the one of the terminals engaged by wiper 3WS, after the transmission of the second directive digit to the answering connector has been completed in the above-described manner and before the release of relay 3SD, a circuit is completed between wiper 3SW and the battery-connected winding of busy test relay 3BT. The circuit is traced from wiper 3WS, make contacts 3SD6, and the winding of battery 3BT to battery. The presence of ground on wiper 3WS completes an obvious operating circuit for relay 3BT. Relay 3BT thereupon operates.

The operation of relay 3BT is effective for transferring the calling subscriber line 1L20 from from its connection to direct ground through the upper winding of relay 3CB2 into connection with the low impedance busy tone source at break contacts 3BT2 and make contacts 3BT1, respectively. Therefore busy tone is heard on station B connected to calling line 1L20. The operation of relay 3BT is further effective in response to the subsequent release of relay 3SD which takes place in the above-described manner for closing a locking circuit for itself from ground through make contacts 3RD2 and 3BT5, break contacts 3SW9 and 3SD5, and the winding of relay 3BT to battery. Relay 3BT therefore remains operated so long as relay 3RD is held in operated condition. The operation of relay 3BT is further effective for preventing the switchthrough means comprising switchthrough relay 3SW from operating by opening the operating circuit of that relay which includes the relay's lower winding at break contacts 3BT6. Upon hearing the busy tone, the calling subscriber at station B returns his telephone to its hookswitch, so that the connection is released in the manner to be described presently.

*Unmarked terminal set.*—Assuming next that the terminal set engaged by the wiper set of the operated answering connector is unmarked and that no potential is present on the terminal engaged by wiper 3WS, relay 3BT fails to operate in the above-described manner and relay 3SD subsequently releases. At this time a second circuit for operating the busy test means comprising relay 3BT is completed from ground through make contacts 3RD2 and secondary off-normal contacts 3SON2, rectifier 3RCT, break contacts 3SW1 and 3SD4, thermistor 3TH, break contacts 3SD5, and the winding of relay 3BT to battery.

The presence of thermistor 3TH in the operating circuit of relay 3BT is effective for delaying the operation of relay 3BT for a time interval greater than the time required to operate switchthrough relay 3SD, in order to give relay 3SW time to operate in the manner to be described presently. The delay in operating relay 3BT over the second circuit is necessary because a circuit for operating relay 3SW is completed at the same time that the above-described second operating circuit for relay 3BT is completed. Since the operation of relay BT is effective for preventing the operation of relay 3SW, relay 3SW must win the "race" between itself and relay 3BT when the 1,000 ohm ground signal mentioned above is present on the terminal engaged by wiper 3WS. Assuming that relay 3BT has operated over the above-described second circuit, the operation of the relay is effective in exactly the same manner to apply busy tone to the calling line 1L20 and station B, to complete a locking circuit for itself and to prevent the subsequent operation of relay 3SW.

*Switchthrough.*—It is next assumed that the wiper set of the answering connector has selected a terminal set having a 1,000 ohm ground signal present on the one of the terminals engaged by wiper 3SW. Upon the completion of the transmission of the second impulse train to the answering connector, such as the one shown in Fig. 3, and prior to the release of relay 3SD, the above-described first operating circuit for relay 3BT is completed at make contacts 3SD6. Under these conditions, the 1,000 ohm ground prevents sufficient current to operate relay 3BT from flowing through the winding of that relay. Accordingly, relay 3BT fails to operate over the first of the above-described circuits including make contacts 3SD6. Thereafter relay 3SD releases to complete a circuit for operating the switchthrough means within the connector comprising relay 3SW in response to the selection of a terminal set marked in the aforementioned first manner. The operating circuit of relay 3SW is traced from the marked terminal, wiper 3WS, break contacts 3SD7 and 3BT6, make contacts 3RD5, and the lower winding of relay 3SW to battery. Relay 3SW thereupon operates to the point where only make contacts 3SW3 are closed. Contacts 3SW3 in closed condition are effective for completing a circuit for fully operating relay 3SW which is traced from ground through make contacts 3RD2 and 3SW3, and the upper winding of relay 3SW to battery. Relay 3SW thereupon fully operates.

The full operation of relay 3SW is effective for completing a talking channel between the incoming conductors 3T and 3R of the answering connector and the terminals engaged by wipers 3WT and 3WR at make contacts 3SW7 and 3SW8. Blocking capacitors 3C1 and 3C2 in the answering connector prevent signaling current supplied to calling line 1L20 from passing through the multiple connection established over wipers 3WT and 3WR and vice versa. The operation of relay 3SW is also effective for connecting the ground-connected upper winding and battery-connected lower winding of relay 3SR to wipers 3WT and 3WR, respectively, at make contacts 3SW5 and 3SW6, respectively, over an obvious circuit. The operation of relay 3SW is further effective for opening the operating circuit of release magnet 3RM at break contacts 3SW4. The operation of 3SW is further effective for opening the above-described operating circuit for relay 3BT at break contacts 3SW1 in order to prevent the operation of relay 3BT at this time. The operation of relay 3SW is further effective for putting direct ground on wiper 3WS and its multiply connected, engaged terminal through make contacts 3RD2 and 3SON2, rectifier 3RCT, and make contacts 3SW2 to wiper 3WS. Application of direct ground to wiper 3WS comprises a signal for marking busy the engaged terminal set and any one of the corresponding terminal sets accessible from other answering connectors.

*Completing a connection between a calling and an answering connector*

At this point a connection has been completed between calling line 1L10 and its station A to the operated one of the calling connectors such as the one shown in Figs. 2*a* and 2*b* and a connection has been completed between answering line 1L20 and its station B and the talking channel comprising the multiple conductors connected to the ones of the terminal set engaged by wipers 3WT and 3WR of the operated answering connector such as the one shown in Fig. 3. Thus the paging and paged parties at stations A and B, respectively, are now connected to each other. The above-described application of ground and battery signals to wipers 3WT2 and 3WR and the multiple conductor talking channel comprises a signal for indicating to the corresponding operated calling connector that the call has been answered. The multiple conductors extending between the terminal sets are connected so that the one of the conductors connected to the terminal engaged by wiper 3WT is connected to the terminal engaged by wiper 2WT, and so that wiper 3WR is similarly connected to wiper 2WR. The application of ground in the above-described manner to wipers 3WT and 2WT and the application of battery to wipers 3WR and 2WR is hereinafter referred to as a normal supervisory signal, as compared to a later described reverse supervisory signal.

Referring to the calling connector shown in Figs. 2*a* and 2*b*, the calling connector includes means comprising normal battery relay 2NB and reverse battery 2RB for detecting normal and reverse, respectively, supervisory signals applied to the paging system talking channel. The windings of relays 2NB and 2RB are connected in series and the combination bridged across the talking channel by break contacts 2SD7 and 2SD8. With this arrangement, the signal detecting means is connected (and therefore made operative) only after secondary delay relay 2SD has released at the end of transmission of the second directive digit to the calling connector in the previously described manner. Current flowing through the windings of relays NB and RB as the result of the application of a supervisory signal is sufficient to operate either relay. In order to make relay 2NB only respond to the normal supervisory signal, the winding of relay 2RB is shunted by rectifier 2RCT1 which is poled to short out the winding of relay 2RB when the above-described normal supervisory signal is applied to wipers 2WT and 2WR. Similarly, in order to make relay 2RB only respond to a reverse supervisory signal, the winding of relay 2NB is shunted by rectifier 2RCT2 which is poled to short out the winding of relay RB when the above-described reverse supervisory signal is applied between wipers 2WT and 2WR.

Returning to the point where a normal supervisory signal is applied between wipers 2WT and 2WR, relay 2NB operates as indicated above. The operation of relay 2NB is effective for opening the previously described operating circuit for start relay 2ST at break contacts 2NB1. Relay 2ST, a slow release type, releases thereafter. The operation of relay 2NB further is effective before the release of relay 2SD is completed for completing an operating circuit for answering supervisory relay 2AN which is traced from ground through break contacts 2RB2, make contacts 2SW1, 2NB2, and 2ST3, and the winding of relay 2AN to battery. Relay 2AN thereupon operates. The operation of relay 2AN is effective for closing an obvious locking circuit for itself at make contacts 2AN10 which are in parallel with make contacts 2ST3, so that the subsequent release of relay 2ST3 is not effective for releasing relay 2AN.

The release of relay 2ST is effective for opening the previously described connection of ringback tone to calling line 1L10 at make contacts 2ST1 in order to inform the paging party at station A that this paging call has been answered. The release of relay 2ST is further effective in the previously described manner for opening the above-traced operating circuit for relay 2AN at make contacts 2ST3. The release of relay 2ST is further effective for removing ground from the encoder control start conductor 2ST10 at make contacts 2ST4, so that the encoder control start relay 6ST can release at this time if the Fig. 3 calling connector has been the only one of the first plurality in operated condition and waiting for a paged party to answer. Referring to the encoder control shown in Figs. 6*a* and 6*b*, the release of relay 6ST is effective for placing the encoder control in normal condition, so that it is thereafter in condition to respond to a demand signal from other operated ones of the calling connectors.

The release of relay 2ST is further effective for removing the resistance ground signal from conductor 2SR10 outgoing to the encoder control shown in Figs. 6*a* and 6*b*. Therefore, the encoder control, which is limited to serving four calling connectors at any one time in the manner set forth in the preceding section, is now free to serve one additional connector. In the event that connectors other than the one in Fig. 3 are in operated condition and waiting for a paged party to answer, the release of relay 2ST is effective for removing the marking ground which identifies the calling one of the calling connectors for marking lead 2MK10 at make contacts 2ST5. Thereafter, the rotary switch within the previously described encoder control is not stopped on the terminal set individual to the Fig. 3 connector, even though the calling connector has not yet completed the transmission of three complete signals to encoder transmitter 56.

The operation of relay 2AN in the above-described manner is effective for reversing the direction of current flow within calling line 1L10 and at calling station A at reversing contacts 2AN1, 2AN2, 2AN3, and 2AN4 in order to further indicate that the call has been answered. The operation of relay 2AN is further effective for completing an operating circuit for answering repeater relay 2ANR at make contacts 2AN7. The latter circuit is traced from ground through make contacts 2RD4 and 2AN7 and the winding of relay 2ANR to battery. Relay 2ANR thereupon operates.

The operation of relay 2ANR is effective for closing an obvious holding circuit for itself at contacts 2ANR1 which are in parallel with contacts 2AN7. The operation of relay 2ANR is further effective for further opening the previously traced operating circuit for start relay 2ST at break contacts 2ANR2. The operation of relay 2ANR is further effective for transferring wiper 2WS from its previously traced connection to the 1,000 ohm ground into connection with direct ground at break contacts 2ANR4 and make contacts 2ANR3. At this point direct ground is applied to wipers 2WS and 3WS at make contacts 2ANR3 within the calling connector and 3SW2 within the answering connector, so that the busy condition on the terminal sets engaged by the calling and answering connectors of Figs. 2 and 3 is maintained upon the subsequent release of one or the other of the connectors. Both calling and answering connectors remain in the above-described conditions until the switch trains through which the connection has been established are released in the manner to be described presently.

*Group paging*

The above description has been confined to the case of answering of a paging call in response to the transmission to a single radio frequency station such as RF1. It has been pointed out that only one answering party using one of the pluralities of answering connectors is allowed to extend a connection to a particular terminal set on which a paging call is waiting. In some cases, it may be desirable to make a particular terminal set accessible to more than one answering connector at any one time, as for instance, in systems where a number of radio frequency stations for emergency use are responsive to the same coded signal from encoder transmitter 56, and it is required that all such station users are to be able to extend connections from telephone stations through the answering connectors to the particular terminal set corresponding to the emergency service directory number. With this arrangement, all answering parties are connected to the calling (paging) party and in parallel with each other. The apparatus used for bringing about this conference type connection is next described in detail.

All conference type terminal sets are located within a particular level or levels. I provide means within each of the answering connectors, such as the one shown in Fig. 3, operative in response to the primary advance of the wiper set to such levels for indicating the character of the terminal sets therein and which is effective for making the busy test means within the connector inoperative.

In the preferred embodiment of my invention, the level marking means comprises a wiper 3WLM for engaging one of a plurality of level marking terminals, each terminal corresponding to one of the levels accessible to the calling connector. The levels in which emergency service terminal sets are located are characterized by a connection between the lower winding of switchthrough relay 3SW by way of make contacts 3RD5. Wiper 3WLM is connected to the test, sleeve wiper 3WS through break contacts 3SD7 and make contacts 3BT8.

With this arrangement, when the wiper set of the connector is advanced into engagement with the terminal set on which ground is applied to wiper 3WS, busy test means including relay 3BT is operated in the previously described manner. Assuming that the engaged wiper set is in one of the aforementioned specially marked levels, the operation of relay 3BT is effective for closing an alternate operating circuit for relay 3SW which is traced from wiper 3WS through break contacts 3SD7, make contacts 3BT8, wiper 3WLM, the aforementioned marking conductor connected to the terminal set, make contacts 3RD5, and the lower winding of relay 3SW to battery. Relay 3SW thereupon operates and is effective in the previously described manner for completing a connection between the called, paged party connected to the incoming conductors, shown collectively as IC20 and the calling, paged party through the operated one of the calling connectors. The operation of relay 3SW at this time is also effective for opening the previously described locking circuit for relay 3BT at break contacts 3SW9, with the result that relay 3BT is released. As a result of the release of relay 3BT the busy tone applied in the previously described manner is not applied at this time to the line of the called, paged party. In this manner, as many of the answer connectors as required may be operated by answering (paged) parties in order to establish connections to a single one of the terminal sets accessible to the plurality of answering connectors.

*Alarm condition*

Thus far in the description of our system, it has been assumed that the control exercised by the paging party at station A over the calling connector and decoding matrix has been effective to bring about the above described results. However, in the operation of the calling connector and encoder control, it is possible that the equipment will fail to function in the described manner. For instance, upon the application of an energizing signal to the one of the terminals engaged by wiper 2WHS within the calling connector, no relay or more than one relay within any one of the decoding matrices A, B or C might be operated. It is to be recalled that the proper operation of each decoding matrix requires the operation of one and only one relay. Accordingly, apparatus of the type described in the aforementioned application of Gatzert et al. may be provided to indicate such misfunction within the decoding matrix.

Another example of an alarm condition is where neither a proper output signal nor an alarm signal is received at the encoder control shown in Figs. 6*a* and 6*b* from the decoding matrices. Such a condition might arise upon the occurrence of an open condition between conductor 6SY10 and either of conductors 6SS10 and 6ALM10. Such an alarm condition is characterized by the failure of either relay 6SS to operate or alarm relays 6AL and 6ALR to operate within a predetermined time interval. Under this alarm condition, the encoder control switch is maintained on the particular terminal set individual to the one of the calling connectors demanding service without transmitting either start or alarm signal to the operated service demanding calling connector.

In order to deal with this situation, I provide means including second alarm repeater relay 6ALRP which is made operative in response to the operation of relays 6SW and 6SWR and in response to the failure of relays 6SS and 6AL to operate. The operating circuit for relay 6ALRP has been traced in the foregoing description under the subtitle "Stepping the Encoder Control Switch." Means including thermistor 6R1 is provided in the operating circuit of relay 6ALRP for delaying the operation of relay 6ALRP for a time interval sufficient to operate either relay 6SS over the above-traced circuit or relay 6AL over the circuit traced in the aforementioned Gatzert et al. application. If either relay 6SS or 6AL become operated before relay 6ALRP, the operating circuit of the latter relay is opened at either of break contacts 6SS3 or 6AL4, with the result that the alarm indicating means including second alarm repeater relay 6ALRP is disabled and the apparatus controlled thereby is kept inoperative in the face of successful operation of the signal starting means or other alarm apparatus within the encoder control.

Assuming that an alarm condition exists and that neither relay 6SS nor 6AL is operated in the time required to build up current through the operating circuit of relay 6ALRP including thermistor 6R1, relay 6ALRP operates. The operation of relay 6ALRP is effective for closing a locking circuit for itself by way of make contacts 6ALRP1 and break contacts 6RLK1 on manually controlled release key 6RLK. The operation of relay 6ALRP is further effective for opening its own operating circuit at break contacts 6ALRP2.

The operation of relay 6ALRP is further effective for disabling the encoder control by opening the previously described operating circuit for starting means including relay 6ST at break contacts 6ALRP4. Relay 6ST releases immediately, so that the encoder control is not effective thereafter for supplying the signals to any of the calling connectors until relay 6ALRP is released in the manner to be described presently. Until relay 6ALRP is released, the encoder control switch is retained on the terminal set of the one of the calling connectors which was in use when the alarm condition arose. This is done in order to assist the attendant in his problem of diagnosing the alarm-causing condition.

The operation of relay 6ALRP is further effective for activating alarm signaling means, such as lamp 6ALL, by completing an obvious energizing circuit for that lamp at make contacts 6ALRP3. The lamp serves to signal an attendant or other person that an alarm condition exists and that the broadcast paging system is shut down.

The broadcast paging system remains in alarm condition until the attendant manually releases relay 6ALRP by operating the release means including relay 6RLK. Operation of key 6RLK is effective for opening at break contacts 6RLY1 the locking circuit for relay 6ALRP, which thereupon releases. The restoration of relay 6ALRP to its normal condition is effective for restoring the operating circuit of relay 6ST at break contacts 6ALRP4 and opening the energizing circuit for lamp 6ALL at make contacts 6ALRP3.

*Release of the switch trains*

At the completion of a normal paging call or at any time before that, the release of operated ones of the switch trains including operated ones of the calling and answering connectors included in the paging call is normally under the control of the call directing means including the calling stations and lines. Release of the switch trains is initiated in the conventional manner when the party or parties at the calling line station or stations hang up.

*Release of the switch train including the calling connector.*—The return of the telephone to its hookswitch at the station A by the paging party is effective for opening the previously described operating circuit for relay 2CB at the hookswitch contact of the station subset. Relay 2CB thereupon releases, opening the previously described circuit for operating release delay relay 2RD at make contacts 2CB1.

The release of relay 2RD is effective for opening the above-traced operating circuits for relays 2PD and 2SD and the previously described locking circuits for any of relays 2BT, 2SW, and 2ANR at make contacts 2RD4. As a result, any operated one of these relays is thereupon released. If relay 2BT has been operated, its release is effective for retransferring the upper winding of relay 2CB from its connection to the busy tone source into connection with direct ground at make contacts 2BT4 and break contacts 2BT3, respectively. If relay 2SW has been operated, its release is effective for opening the above-described operating circuit for normal battery relay 2NB and for disconnecting the incoming talking channel conductors of the connector including 2T and 2R from the wiper set at make contacts 2SW3 and 2SW4. Relay 2NB thereupon releases. The release of relay 2SW is further effective for opening the above-described operating circuits for relays 2AN and 2ST at make contacts 2SW1. Therefore either of relays 2ST or 2AN which has been operated is thereupon released. If relay 2ANR has been operated, its release is effective for repreparing the operating circuit of relay 2ST at break contacts 2ANR2. The release of relay 2SW is further effective for removing both the direct and resistance ground connection to wipers 2WS at make contacts 2SW5. If relay 2AN has been operated, its release is effective for rereversing the connection of the windings of relay 2CB to incoming conductors 2T and 2R at transfer contacts 2AN1—2AN2 and 2AN3—2AN4.

The release of relay 2RD is effective in response to the previous advance of the wiper set away from its normal position and the consequent operation of the previously described off-normal means for completing a circuit for energizing release magnet 2RM from ground through break contacts 2AL5, 2SW2, and 2RD6, either or both operated, parallel-connected primary and secondary off-normal springs 2PON3 and 2SON2, respectively, and magnet 2RM to battery. The energization of magnet 2RM is effective for restoring the wiper set of the calling connector from its operated position to its primary and secondary off-normal positions. The operation of magnet 2RM is further effective for applying ground to incoming sleeve conductor 2S at make contacts 2RM1 in order to mark the calling connector busy until the release of the connector has been completed.

The return of the wiper set to its normal position is effective for restoring the previously described off-normal means of the connector to their normal conditions, so that the above-traced operating circuit for magnet 2RM is opened at make contacts 2PON3 and 2SON2. Magnet 2RM thereupon releases and removes the busy marking ground from conductor 2S at make contacts 2RM1.

At this point the operated one of the calling connectors has been returned to its normal condition. It is thereafter available for reuse by other parties wishing to place paging calls.

*Release of the answering connector.*—If, at the conclusion of a successful or unsuccessful attempt to extend a connection from a paged party at a station such as B through one of the answering connectors such as the one shown in Fig. 3, the answering party wishes to discontinue the call, the telephone is returned to its hookswitch at station B, thereby opening the above-described operating circuit for relay 3CB at the station hookswitch contacts. Relay 3CB thereupon releases and opens the above-described operating circuit for relay 3RD at make contacts 3CB1. Relay 3RD thereafter releases.

The release of relay 3RD is effective for opening the previously described operating circuit for relays 3PD, 3SD, and 3SW and the holding circuits for relay 3BT at make contacts 3RD2. Any operated ones of these relays are thereupon released. If relay 3BT has been operated, its release is effective for retransferring the upper winding of relay 3CB from its connection to the busy tone source to connection with direct ground at make contacts 3BT1 and 3BT2, respectively. If relay 3SW has been operated, its release at this time is effective for disconnecting the incoming talking conductors of the answering connector from the wiper set and for opening the previously traced operating circuit for relay 3SR at make contacts 3SW7 and 3SW8. If relay 3SR has been operated, it is released at this point. The release of relay 3SR is effective for rereversing the connection of relay 3CB windings to incoming conductors 3T and 3R at transfer contacts 3SR2—3SR1 and 3SR3—3SR4.

The release of relays 3RD and 3SW is effective for completing an energizing circuit for release magnet 3RM. The circuit is traced from ground through break contacts 3RD4 and 3SW4, either or both, parallel-connected make contacts 3PON2 and 3SON3, and the winding of magnet 3RM to battery. The energization of magnet 3RM is effective for restoring the wiper set of the answering connector from its operated position to normal position. The energization of magnet 3RM is also effective for applying busy marked ground to incoming sleeve conductor 3S at make contacts 3RM1.

Upon the restoration of the wiper set to its normal position, the previously described primary and secondary off-normal means are also placed in normal condition so that the above-described energizing circuit for magnet 3RM is opened at make contacts 3PON2 and 3SON3. Magnet 3RM is thereby deenergized. The deenergization of magnet 3RM is effective for opening contacts 3RM1 in order to remove ground from incoming sleeve conductor 3S. The answering connector is thereupon fully released. It is again available for use by paged parties in making calls.

It is to be noted that in the case where the single answering connector employed in the paging connection has been resorted to normal, the terminal set to which the calling connector has been advanced is maintained in busy condition to other calling connectors and any of the answering connectors by ground maintained on the one of the terminals still engaged by wiper 2WS through make contacts 2ANR3 and 2SW5. This busying ground signal is removed and the terminal set made available by the subsequent release of the calling connector wiper set from its engagement with the terminal set, so that paging calls may be placed to the radio frequency signaling station corresponding to that terminal station thereafter.

In the case where the calling connector has already been released and the single one of the answering connectors used to complete the call is maintained in its operated condition, the terminal set engaged by the wiper set of the operated one of the answering connectors continues to be marked busy to others of the answering connectors as well as to all the calling connectors by the continued application of ground to that terminal set through make contacts 3RD2 and 3SON2, rectifier 3RCT, make contacts 3SW2 and wiper 3WS in the previously described manner. This ground signal is removed upon the subsequent release in the above-described manner of the wiper set from its engagement with the terminal set, so that the radio frequency station corresponding to the terminal set can again be signaled in the previously described manner.

In the case where the calling connector has been released from its engagement with a terminal set, but the plurality of answering connectors advanced to engage one of the conference terminal sets (described in the previously set forth special case) remain in engagement with the terminal set, the terminal sets multiply connected thereto and accessible to the calling connectors remain in busy condition owing to the continued application of the ground busy marking signal to the multiply connected terminal sets over the above-traced circuit including rectifier 3RCT. However, so far as the other answering connectors are concerned, the multiply connected terminal sets engaged by ones of the answering connectors is still accessible from other answering connectors because the above-described level marking means for marking the busy test means within the answering connectors remains operative upon the release of the calling connector. As a result, the advance of one other answering connector into engagement with the terminal set within one of the special marked levels which is already in busy condition results in a conference type connection between parties through the operated answering connectors. Thereafter, any of the operated answering connectors may be released independently of each other from these multiply connected terminal sets. The busy condition on the multiply connected terminal sets, however, is maintained until all such answering connectors have been released.

While I have shown and described the preferred embodiment of my invention, other modifications will readily occur to those skilled in the telephone art. I therefore aim in the appended claims to cover all such modifications as fall within the true spirit and scope of my invention.

What is claimed is:

1. In a communication system, a plurality of connectors, calling means for directively operating said connectors individually, control means common to said connectors for intermittently transmitting signals to said connectors, means within each of said connectors operative in response to each signal received from said common control means for further controlling the operation of the corresponding one of said connectors, and means within each of said connectors operative in response to a predetermined number of operations of said signal responsive means within the corresponding one of said connectors for making said common control means ineffective with respect to the corresponding one of said signal responsive means, whereby any operated one of said connectors responds to only a predetermined number of signals transmitted from said common control means following the operation of that connector.

2. In a communication system, a plurality of connectors, a corresponding plurality of terminal set groups, calling means for directively operating any of said connectors into engagement with any of said terminal sets within the corresponding one of said groups, means within each of said connectors for indicating the operation thereof, control means common to said connectors operative in response to the operation of said operation indicating means for intermittently transmitting signals to operated ones of said connectors, means within each of said connectors operative in response to signals received from said common means for transmitting signals over the one of said terminal sets selected by the corresponding one of said connectors, and means within each of said connectors operative in response to a predetermined number of operations of said signal transmitting means within the corresponding one of said connectors for rendering said common control means ineffective with respect to said signal transmitting means within the corresponding one of said connectors, whereby any operated one of said connectors transmits only a predetermined number of signals to a selected one of said terminal sets.

3. The communication system set forth in claim 2 wherein said common control means includes means operative for distributing single signals to each operated one of said connectors in succession, whereby operated ones of said connectors are made operative in sequence to transmit signals to terminal sets engaged by said connectors.

4. The communication system set forth in claim 2 and having in addition means for transmitting supervisory signals to any of said terminal sets, and means within each of said connectors operative in response to a supervisory signal received from the one of said terminal sets engaged by the corresponding one of said connectors for rendering said common control means ineffective with respect to the corresponding one of said signal transmitting means, whereby any operated one of said connectors transmits a number of signals up to a predetermined maximum to a selected one of said terminal sets.

5. The communication system set forth in claim 4 wherein said common control means includes means operative for distributing single signals in succession to each operated one of said connectors, whereby operated ones of said connectors are made operative in sequence to transmit signals to terminal sets engaged by said connectors.

6. In a communication system, a plurality of connectors, a plurality of calling means, each of said calling means being operative for directively operating any one of said connectors, seizure means within each of said connectors operative for indicating the selection thereof, means common to said connectors for controlling operated ones of said connectors, and group means common to said connectors operative in response to the coincidental operation of said seizure means of a predetermined number of said connectors for making said common controlling means inoperative with respect to the remainder of said connectors in order to limit the total demand for service on said common control means by said connectors at any one time.

7. The communication system set forth in claim 6 wherein each of said calling means is operative for extending a connection to any idle one of said connectors, and said seizure means is operative for making the corresponding one of said connectors busy to others of said calling means in order to prevent two or more calling means from extending connections to the same one of said connectors, and said common group means is effective for transmitting busy indicating signals to all of said connectors, and having in addition means in each of said connectors operative in response to the normal condition of said seizure means for making the corresponding one of said connectors appear busy to said calling means.

8. In a communication system, a plurality of connectors, a corresponding plurality of terminal set groups, a plurality of calling means, each of said calling means being operative for directively operating any one of said connectors into engagement with any one of said terminal sets in the corresponding one of said groups, seizure means within each of said connectors operative in response to the operation thereof for indicating the selection of the corresponding one of said connectors by one of said calling means, means common to said connectors for controlling operated ones of said connectors, and group means common to said connectors operative in response to the coincidental operation of said seizure means within a predetermined number of said connectors for making said common controlling means inoperative with respect to the remainder of said connectors, in order to limit the total demand for service on said control means by said connectors at any one time.

9. The communication system set forth in claim 8 wherein each of said calling means is operative for extending a connection to any idle one of said connectors, and said seizure means is operative for making the corresponding one of said connectors busy to others of said calling means in order to prevent two or more calling means from extending connections to the same one of said connectors, said common group means is effective for transmitting busy indicating signals to all of said connectors, and having in addition means in each of said connectors operative in response to the normal condition of said seizure means for making the corresponding one of said connectors appear busy to said calling means.

10. The communication system set forth in claim 9 wherein said common control means includes means for transmitting signals to any operated one of said connectors and having in addition means in each of said connectors responsive to signals from said common control means for transmitting signals to the one of said terminal sets selected by the corresponding one of said connectors.

11. The communication system set forth in claim 10 and having in addition means for transmitting supervisory signals to any of said terminal sets, and means within each of said connectors operative in response to a supervisory signal received from the one of said terminal sets engaged by the corresponding one of said connectors for making the corresponding one of said seizure means ineffective with respect to said common group means.

12. In a communication system, a plurality of connectors, a corresponding plurality of terminal set groups, a plurality of calling means, each of said calling means being operative for extending a connection to and thereafter directively operating any idle one of said connectors into engagement with any one of said terminal sets within the corresponding one of said groups, seizure means within each of said connectors operative in response to the extension of a connection thereto from any one of said calling means for making the corresponding one of said connectors busy to each of said calling means, control means common to said connectors for intermittently transmitting signals to operated ones of said connectors, signaling means within each of said connectors operative in response to the operation thereof and to each signal received from said common control means for further controlling the operation of the corresponding one of said connectors, means within each of said connectors operative in response to a predetermined number of operations of the corresponding one of said signaling means for making said common control means ineffective with respect to the corresponding one of said signaling means, group means common to said connectors operative in response to the operation of said seizure means within a predetermined number of said connectors for transmitting a busy signal to all of said connectors, said seizure means in normal condition being effective in response to the receipt of a signal from said group means for making the corresponding one of said connectors busy to ones of said calling means, whereby only a predetermined number of idle ones of said connectors can be operated coincidentally by ones of said calling means, and each of the operated ones of said connector signaling means therein is operated only a predetermined number of times.

13. The communication system set forth in claim 12 and having in addition means for transmitting a signal to any of said terminal sets, and means within each of said connectors operative in response to a signal received from the one of said terminal sets engaged by the corresponding one of said connectors for making said common control means ineffective with respect to the corresponding one of said signaling means and for making the corresponding one of said seizure means ineffective with respect to said group means, whereby said control means is freed for use in the other of said connectors following its use in connection with a predetermined number of said connectors wherein each of the predetermined number of connectors is made effective to transmit a predetermined number of signals to selected ones of said terminal sets or upon the receipt of a supervisory signal from the selected ones of said terminal sets.

14. The communication system set forth in claim 13 wherein said signaling means in each of said connectors is operative for transmitting signals to the one of said terminal sets engaged by the corresponding one of said connectors.

15. In a communication system, a plurality of answering connectors, a corresponding plurality of terminal set groups, said terminal sets in each of said groups being arranged in levels and multiply connected to corresponding ones of said terminal sets in all others of said groups, a plurality of calling means for selecting and directively extending a connection to any one of said answering connectors and thereafter causing the selected one of said answering connectors to first select one of said levels and secondly select one of said terminal sets within the selected one of said levels, switchthrough means in each of said connectors operative in response to the selection of any one of said terminal sets for extending a connection from one of said calling means connected to the corresponding one of said connectors and for making busy the selected one of said terminal sets, busy test means in each of said connectors normally operative in response to the engagement of a busy marked terminal set for preventing the operation of the corresponding one of said switchthrough means, and means in each of said connectors operative in response to the selection of a terminal set within a particular one of said levels and to the operation of a corresponding one of said busy test means for operating the corresponding one of said switchthrough means, whereby conference type connections including two or more of said calling means can be established through corresponding terminal sets situated in particular ones of said levels.

16. The communication system set forth in claim 15 and having in addition means including a calling connector for selecting and extending connections to any one of said terminal sets in each of said groups, said calling connector including means for marking busy the selected one of said terminal sets, whereby a conference type connection including two or more of said answering connectors or said calling connector and two or more of said answering connectors may be established through corresponding ones of said terminal sets in corresponding ones of said groups.

17. The communication system set forth in claim 15 wherein said calling connector includes first operative means for marking the selected ones of said terminal sets in a call awaiting condition and means operative in response to the subsequent selection of the one of said terminal sets by any one of said answering connectors for making said calling connector busy marking means operative, and wherein said switchthrough means in each of said answering connectors is operative only in the presence of a call awaiting signal on the selected one of said terminal sets, whereby a conference type connection including two or more of said calling means cannot be established upon the selection of corresponding ones of said terminal sets within said particular levels unless those terminal sets have already been marked by said calling connector.

No references cited.